United States Patent
Moon et al.

(10) Patent No.: US 9,750,009 B2
(45) Date of Patent: *Aug. 29, 2017

(54) METHOD FOR TRANSMITTING INFORMATION IN A BROADCAST SYSTEM

(71) Applicant: LG ELECTRONICS INC., Seoul (KR)

(72) Inventors: Sung Ho Moon, Anyang-si (KR); Minseok Noh, Anyang-si (KR); Yeong Hyeon Kwon, Anyang-si (KR); Jin Sam Kwak, Anyang-si (KR); Dong Cheol Kim, Anyang-si (KR); Seung Hee Han, Anyang-si (KR); Hyun Woo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/393,005

(22) Filed: Dec. 28, 2016

(65) Prior Publication Data

US 2017/0111892 A1    Apr. 20, 2017

Related U.S. Application Data

(60) Continuation of application No. 14/538,387, filed on Nov. 11, 2014, now Pat. No. 9,578,624, which is a (Continued)

(30) Foreign Application Priority Data

Jun. 18, 2008 (KR) .................. 10-2008-0057271

(51) Int. Cl.
*H04W 4/00* (2009.01)
*H04W 72/04* (2009.01)

(52) U.S. Cl.
CPC ..... *H04W 72/042* (2013.01); *H04W 72/0446* (2013.01)

(58) Field of Classification Search
CPC .. H04L 5/0053; H04L 5/0058; H04W 72/042; H04W 48/12; H04W 72/0446
(Continued)

(56) References Cited

U.S. PATENT DOCUMENTS 6,282,430 B1  8/2001  Young
6,529,527 B1  3/2003  Chen et al.
(Continued)

FOREIGN PATENT DOCUMENTS

JP    8-051422 A    2/1996
KR   10-2007-0103667 A   10/2007
(Continued)

OTHER PUBLICATIONS

U.S. Appl. No. 14/538,387, filed Nov. 11, 2014.
(Continued)

*Primary Examiner* — Mang Yeung
(74) *Attorney, Agent, or Firm* — Dentons US LLP

(57) ABSTRACT

A method of allocating control information in a wireless communication system is provided. The method includes: allocating essential control information of a first system to a first sub-frame in a frame including a plurality of sub-frames each of which comprises a plurality of orthogonal frequency-division multiplexing (OFDM) symbols; and allocating essential control information of a second system to an $n^{th}$ sub-frame in a fixed position from the first sub-frame (where n is an integer satisfying n>1). Accordingly, in a frame supporting heterogeneous systems, essential control information can be fixedly allocated to a specific position while maintaining the number of system switching points, at which switching occurs between the systems, to one even if
(Continued)

a radio resource allocation amount changes between the systems, and thus the essential control information that must be received by all user equipments can be effectively provided without the increase of overhead.

2 Claims, 28 Drawing Sheets

Related U.S. Application Data division of application No. 13/866,950, filed on Apr. 19, 2013, now Pat. No. 9,237,554, which is a continuation of application No. 12/919,567, filed as application No. PCT/KR2009/000899 on Feb. 25, 2009, now Pat. No. 8,437,301.

(60) Provisional application No. 61/031,368, filed on Feb. 26, 2008, provisional application No. 61/038,040, filed on Mar. 19, 2008, provisional application No. 61/038,057, filed on Mar. 20, 2008.

(58) Field of Classification Search
USPC ....... 370/294, 329, 324, 350, 498, 503, 330; 455/450–509
See application file for complete search history.

(56) References Cited

U.S. PATENT DOCUMENTS

| | | | |
|---|---|---|---|
| 6,658,235 | B1 | 12/2003 | Tolmunen et al. |
| 6,941,132 | B2 | 9/2005 | Van Lieshout et al. |
| 8,437,301 | B2 | 5/2013 | Moon et al. |
| 9,237,554 | B2 | 1/2016 | Moon et al. |
| 2007/0217530 | A1* | 9/2007 | Hosseinian ......... H04L 25/0234 375/260 |
| 2008/0025251 | A1* | 1/2008 | Lee ....................... H04B 7/2606 370/328 |
| 2008/0056390 | A1* | 3/2008 | Rainbolt ............... H04L 25/022 375/260 |
| 2008/0186939 | A1* | 8/2008 | Kim ...................... H04W 16/14 370/343 |
| 2009/0161591 | A1* | 6/2009 | Ahmadi ............... H04L 27/2602 370/312 |
| 2009/0303928 | A1* | 12/2009 | Chun .................... H04L 1/0027 370/328 |
| 2010/0098006 | A1 | 4/2010 | Golitschek Edler Von Elbwart et al. |
| 2011/0019753 | A1 | 1/2011 | Ko et al. |

FOREIGN PATENT DOCUMENTS

| | | |
|---|---|---|
| KR | 10-2007-0104282 A | 10/2007 |
| RU | 2 292 119 C2 | 2/2006 |

OTHER PUBLICATIONS

Moon et al., "Frame Structure for IEEE 802.16m", IEEE 802.16 Broadband Wireless Access Working Group, IEEE C802.16m-08/087, Jan. 16, 2008, 18 pages.

Cho et al., "Legacy Support: A Key Design Constraint for 802.16m Frame Structure", IEEE C802.16m-08/063r1, Jan. 21, 2008, 30 pages provided.

Liao et al., "Backward Compatible TDD 802.16m Frame Structure with Reduced Latency over Same or Different Channel Bandwidths", IEEE C802.16m-08/030, Jan. 16, 2008, 11 pages provided.

Yuk et al., "Downlink Control Signaling for Frame Structure Design of IEEE 802.16m" IEEE S802.16m-08/91, Jan. 22, 2008, 16 pages provided.

\* cited by examiner

METHOD FOR TRANSMITTING INFORMATION IN A BROADCAST SYSTEM

CROSS-REFERENCE TO RELATED APPLICATIONS

This application is a Continuation of U.S. patent application Ser. No. 14/538,387 filed on Nov. 11, 2014, which is a Divisional of U.S. patent application Ser. No. 13/866,950 filed on Apr. 19, 2013, now U.S. Pat. No. 9,237,554, which is a Continuation of U.S. patent application Ser. No. 12/919,567 filed on Aug. 26, 2010, now U.S. Pat. No. 8,437,301, which is a National Stage Application of International Application No. PCT/KR2009/000899 filed on Feb. 25, 2009, which claims the benefit of Korean Patent Application No. 10-2008-0057271 filed on Jun. 18, 2008, U.S. Provisional Application No. 61/031,368 filed on Feb. 26, 2008, U.S. Provisional Application No. 61/038,040 filed on Mar. 19, 2008 and U.S. Provisional Application No. 61/038,057 filed on Mar. 20, 2008, all of which are hereby incorporated by reference in their entirety for all purposes as if fully set forth herein.

BACKGROUND OF THE INVENTION

Field of the Invention

The present invention relates to wireless communications, and more particularly, to a method of allocating essential control information in a frame supporting heterogeneous systems.

Related Art

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 (hereinafter, IEEE 802.16e) was completed in 2005 in a format of 'corrigendum'.

Communication between a base station (BS) and a user equipment (UE) includes downlink (DL) transmission from the BS to the UE and uplink (UL) transmission from the UE to the BS. A system profile based on the existing IEEE 802.16e supports a time division duplex (TDD) scheme in which DL transmission and UL transmission are divided in a time domain. In the TDD scheme, UL transmission and DL transmission are performed at different times by using the same frequency band. The TDD scheme has an advantage in that frequency selective scheduling is simply performed since a UL channel characteristic and a DL channel characteristic are reciprocal.

At present, there is ongoing standardization effort for the IEEE 802.16m standard which is a new technical standard based on the IEEE 802.16e. The IEEE 802.16e system considers not only a frequency division duplex (FDD) scheme but also a half-duplex FDD (H-FDD) scheme. In the FDD scheme, DL transmission and UL transmission are simultaneously performed by using different frequency bands. In the H-FDD scheme, DL transmission and UL transmission are performed at different times by using different frequency bands. That is, the H-FDD scheme does not perform DL transmission and UL transmission simultaneously, and a DL radio resource and a UL radio resource are not allocated to a UE using the H-FDD scheme in the same time domain.

An evolution system evolved from a legacy system has to be designed to operate by incorporating the legacy system, which is referred to as backward compatibility. To satisfy the backward compatibility, the evolution system has to be able to support not only the TDD scheme but also the FDD scheme, the H-FDD scheme, etc. As various transmission schemes are supported, essential control information needs to be provided for each of the legacy system and the evolution system. The essential control information is control information that must be acquired by all UEs using the system. Examples of the essential control information include system information to be broadcast, synchronization information, etc. The essential control information for the evolution system is preferably provided without having an effect on the essential control information of the legacy system.

However, how to allocate the essential control information in the evolution system satisfying backward compatibility with the legacy system is not provided yet.

SUMMARY OF THE INVENTION

The present invention provides a method of allocating essential control information in a frame supporting heterogeneous systems.

According to an aspect of the present invention, a method of allocating control information in a wireless communication system is provided. The method includes: allocating essential control information of a first system to a first sub-frame in a frame including a plurality of sub-frames each of which comprises a plurality of orthogonal frequency-division multiplexing (OFDM) symbols; and allocating essential control information of a second system to an $n^{th}$ sub-frame in a fixed position from the first sub-frame (where n is an integer satisfying n>1).

According to an aspect of the present invention, a method of allocating control information in a wireless communication system is provided. The method includes: allocating at least one sub-frame for a first system in a downlink frame including a plurality of sub-frames; allocating at least one sub-frame contiguous in a time domain for a second system to the sub-frame for the first system; allocating essential control information of the first system to the sub-frame for the first system; and allocating essential control information of the second system to the sub-frame for the second system.

DESCRIPTION OF EXEMPLARY EMBODIMENTS

Figure 1:
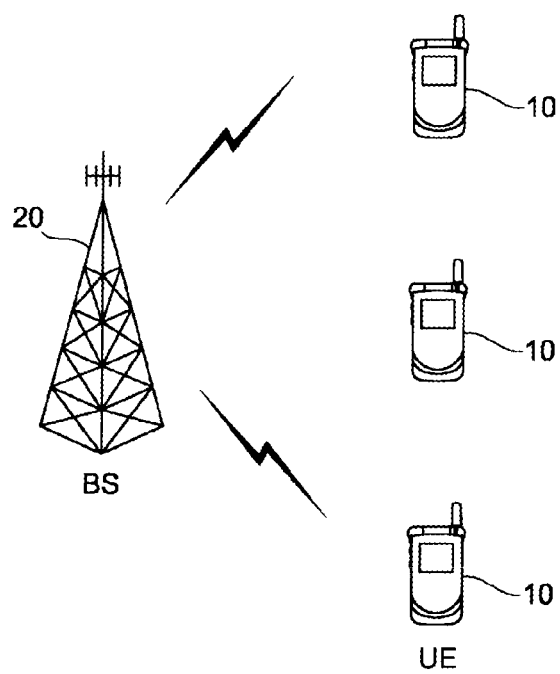
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There may be one or more cells within the coverage of the BS 20.

A downlink (DL) represents a communication link from the BS 20 to the UE 10, and an uplink (UL) represents a communication link from the UE 10 to the BS 20. In the DL, a transmitter may be a part of the BS 20, and a receiver may be a part of the UE 10. In the UL, the transmitter may be a part of the UE 10, and the receiver may be a part of the BS 20.

There is no restriction on the multiple access scheme used in the wireless communication system. Examples of the multiple access scheme are various, such as code division multiple access (CDMA), time division multiple access (TDMA), frequency division multiplex access (FDMA), single-carrier FDMA (SC-FDMA), and orthogonal frequency division multiple access (OFDMA).

The BS 20 has at least one cell. The cell is an area in which the BS 20 provides a communication service. Different communication schemes can be used in one cell. That is, heterogeneous wireless communication systems may exist while sharing a communication service area. Hereinafter, the heterogeneous wireless communication systems or heterogeneous systems refer to systems using different communication schemes. For example, the heterogeneous systems may be systems using different access schemes, or may be a legacy system and an evolution system supporting backward compatibility with the legacy system.

Figure 2:
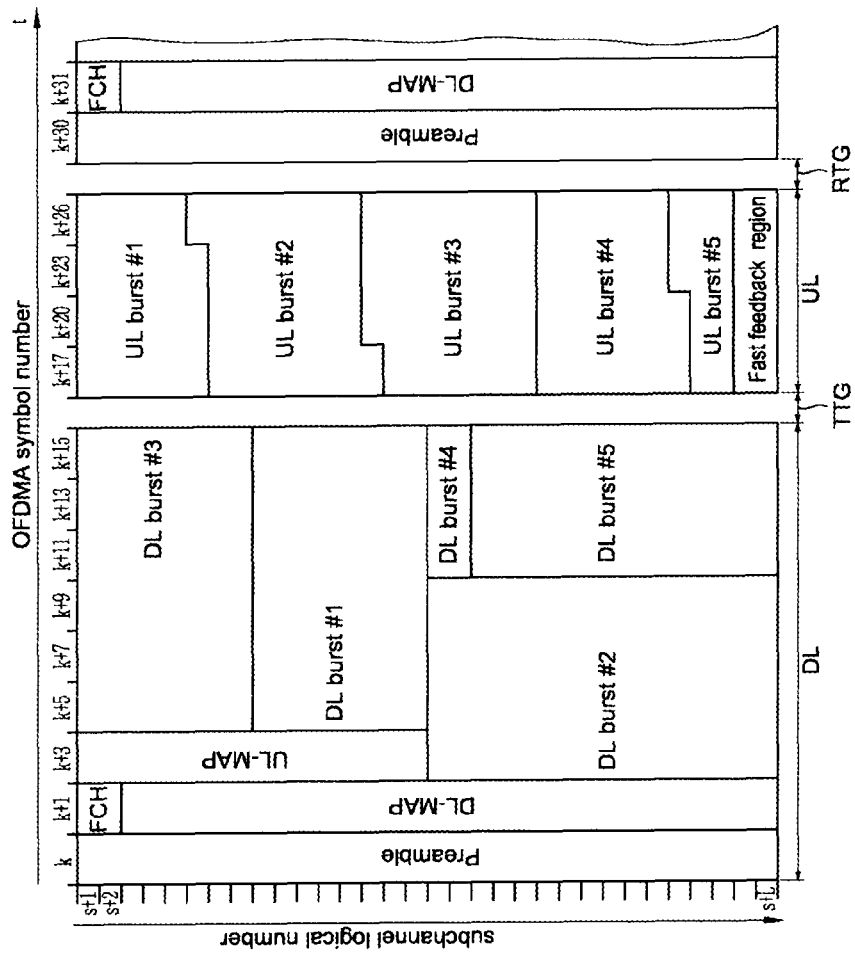
FIG. 2 shows an example of a frame structure.

FIG. 2 shows an example of a frame structure. A frame is a data sequence used according to a physical specification in a fixed time duration. This is a logical frame, and the section 8.4.4.2 of the IEEE standard 802.16-2004 "Part 16: Air Interface for Fixed Broadband Wireless Access Systems" may be incorporated herein by reference.

Referring to FIG. 2, a frame includes a downlink (DL) frame and an uplink (UL) frame. DL transmission is performed through the DL frame, and UL transmission is performed through UL frame. In a time division duplex (TDD) scheme, UL and DL transmissions are achieved at different times but share the same frequency band. The DL frame temporally precedes the UL frame. The DL frame includes a preamble, a frame control header (FCH), a DL-MAP, a UL-MAP, and a burst region, in that order. Guard times are provided to identify the UL frame and the DL frame and are inserted to a middle portion (between the DL frame and the UL frame) and a last portion (next to the UL frame) of the frame. A transmit/receive transition gap (TTG) is a gap between a DL burst and a subsequent UL burst. A receive/transmit transition gap (RTG) is a gap between a UL burst and a subsequent DL burst.

The preamble is used between a BS and a UE for initial synchronization, cell search, and frequency-offset and channel estimation. The FCH includes information on a length of a DL-MAP message and a coding scheme of the DL-MAP.

The DL-MAP is a region for transmitting the DL-MAP message. The DL-MAP message defines access to a DL channel. The DL-MAP message includes a configuration change count of a downlink channel descriptor (DCD) and a BS identifier (ID). The DCD describes a DL burst profile applied to a current MAP. The DL burst profile indicates characteristics of a DL physical channel. The DCD is periodically transmitted by the BS by using a DCD message.

The UL-MAP is a region for transmitting a UL-MAP message. The UL-MAP message defines access to a UL channel. The UL-MAP message includes a configuration change count of an uplink channel descriptor (UCD) and also includes an effective start time of uplink allocation defined by the UL-MAP. The UCD describes an uplink burst profile. The uplink burst profile indicates characteristics of a UL physical channel and is periodically transmitted by the BS by using a UCD message.

Hereinafter, a slot is a minimum possible data allocation unit, and is defined with a time and a subchannel. The number of subchannels depends on an FFT size and time-frequency mapping. The subchannel includes a plurality of subcarriers, and the number of subcarriers per subchannel differs depending on a permutation rule. Permutation is mapping of a logical subchannel onto a physical subchannel. In full usage of subchannels (FUSC), the subchannel includes 48 subcarriers. In partial usage of subchannels (PUSC), the subchannel includes 24 or 16 subcarriers. A segment is at least one subchannel group.

Mapping of data onto a physical subcarrier in a physical layer is performed in two steps in general. In the first step, data is mapped to at least one data slot on at least one logical subchannel. In the second step, each logical subchannel is mapped to the physical subcarrier. This is called permutation. A permutation rule such as FUSC, PUSC, optional-FUSC (O-FUSC), optional-PUSC (O-PUSC), adaptive modulation and coding (AMC), etc., is disclosed in Document 1. A group of orthogonal frequency-division multiplexing (OFDM) symbols using the same permutation rule is referred to as a permutation zone. One frame includes at least one permutation zone.

The FUSC and the O-FUSC are used only in DL transmission. The FUSC consists of one segment including all subchannel groups. Each subchannel is mapped to a physical subcarrier distributed across the entire physical channel. This mapping changes in each OFDM symbol. A slot consists of one subchannel on one OFDM symbol. Pilots are allocated by using different schemes in the O-FUSC and the FUSC.

The PUSC is used both in DL transmission and UL transmission. In DL, each physical channel is divided by a cluster consisting of 14 contiguous subcarriers on 2 OFDM symbols. 6 groups of physical channels are mapped. In each group, a pilot is allocated in a fixed position to each cluster. In UL, subcarriers are divided by a tile consisting of 4 contiguous physical subcarriers on 3 OFDM symbols. A subchannel includes 6 tiles. The pilot is allocated to a corner of each tile. The O-PUSC is used only for UL transmission, and the tile consists of 3 contiguous physical subcarriers on 3 OFDM symbols. The pilot is allocated to a center of the tile. The pilot can also be referred to as a reference signal.

Figure 3:
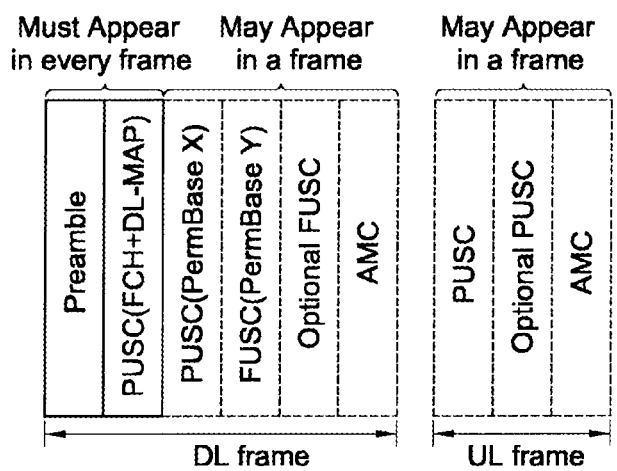
FIG. 3 shows an example of a frame including a plurality of permutations.

FIG. 3 shows an example of a frame including a plurality of permutations. The frame is a physical frame. The section 8.4.4.2 of IEEE standard 802.16-2004 may be incorporated herein by reference.

Referring to FIG. 3, a preamble, an FCH, and a DL-MAP of a DL frame must appear in every frame. The FCH and the DL-MAP use a PUSC permutation. In the DL frame, PUSC, FUSC, selective PUSC, and AMC permutations can appear. The permutation that appears in the DL frame can be defined in the DL-MAP. The PUSC, selective PUSC, AMC permutations can appear in a UL frame. The permutation that appears in the UL frame can be defined in a UL-MAP.

In a logical frame structure, the permutation rule can be selected by considering a frequency diversity gain, a scheduling gain, pilot overhead, multiple-antenna applicability, adaptive antenna applicability, etc. A region in which the same permutation rule is used is referred to as a permutation zone. A plurality of permutation zones are divided in a time domain. Switching of the permutation zone is defined in the DL-MAP or the UL-MAP. A type of the permutation used in the UL frame and the DL frame is not limited, and thus can change variously.

Table 1 shows exemplary parameters for a frame.

TABLE 1

| Transmission Bandwidth(MHz) | 5 | 10 | 20 |
|---|---|---|---|
| Over-sampling factor | | 28/25 | |

TABLE 1-continued

| Sampling Frequency(MHz) | 5.6 | 11.2 | 22.4 |
|---|---|---|---|
| FFT Size | 512 | 1024 | 2048 |
| Sub-carrier Spacing(kHz) | | 10.94 | |
| OFDM symbol time, Tu(us) | | 91.4 | |

| Cyclic Prefix (CP) | Ts(us) | OFDM symbols per Frame | Idle time(us) |
|---|---|---|---|
| Tg = ¼ Tu | 91.4 + 22.85 = 114.25 | 43 | 87.25 |
| Tg = ⅛ Tu | 91.4 + 11.42 = 102.82 | 48 | 64.64 |
| Tg = 1/16 Tu | 91.4 + 5.71 = 97.11 | 51 | 47.39 |
| Tg = 1/32 Tu | 91.4 + 2.86 = 94.26 | 53 | 4.22 |

The preamble, FCH, DL-MAP, or the like of each frame can be used to correctly acquire data or control information in the frame. The preamble, the FCH, and the DL-MAP can be regarded as essential control information required by a UE to perform communication by accessing a network of a system. The frame may have a size of 5 ms. The essential control information is allocated temporally first in the frame.

Hereinafter, a frame supporting heterogeneous systems will be described.

The proposed frame is for a case where the heterogeneous systems share a frequency band, and is not limited to a type or definition of the heterogeneous systems. The heterogeneous systems may be two or more wireless communication systems. For convenience of explanation, it is assumed that two wireless communication systems are multiplexed as the heterogeneous system, and any one of the two systems is defined as a system A and the other system is defined as a system B. The system A may be a legacy system, and the system B may be an evolution system supporting backward compatibility with the system A. For example, the system A may imply a wireless communication system using the IEEE 802.16e standard technique, and the system B may imply a wireless communication system using the IEEE 802.16m standard technique. It is assumed that the system A and the system B share a frequency band by being multiplexed using a time division multiplexing (TDM) scheme. The TDM scheme uses a radio resource by diving it in a time domain at the same frequency band.

In addition, it is assumed that the radio resource is allocated in a sub-frame unit including a plurality of OFDM symbols in the frame supporting the heterogeneous systems. The sub-frame is a minimum unit of constituting the frame and can be defined as a plurality of OFDM symbols. The sub-frame can be a unit of dividing a DL frame and a UL frame by using a TDD scheme in which the DL frame and the UL frame are temporally divided. The sub-frame may be a unit of dividing a resource region for the system A and a resource region for the system B in the frame. When radio resource allocation and scheduling are performed in the sub-frame unit, there is an advantage in that transmission delay can be reduced in data retransmission of a hybrid automatic repeat request (HARQ).

In the system A and the system B, UL transmission and DL transmission can be performed by using a time division duplex (TDD) scheme, a frequency division duplex (FDD) scheme, and a half-duplex FDD (H-FDD) scheme. In the TDD scheme, the UL and DL transmissions are performed at different times by using the same frequency band. In the FDD scheme, UL and DL transmissions are performed simultaneously by using different frequency bands. In the H-FDD scheme, UL and DL transmissions are performed at different times by using different frequency bands.

Figure 4:
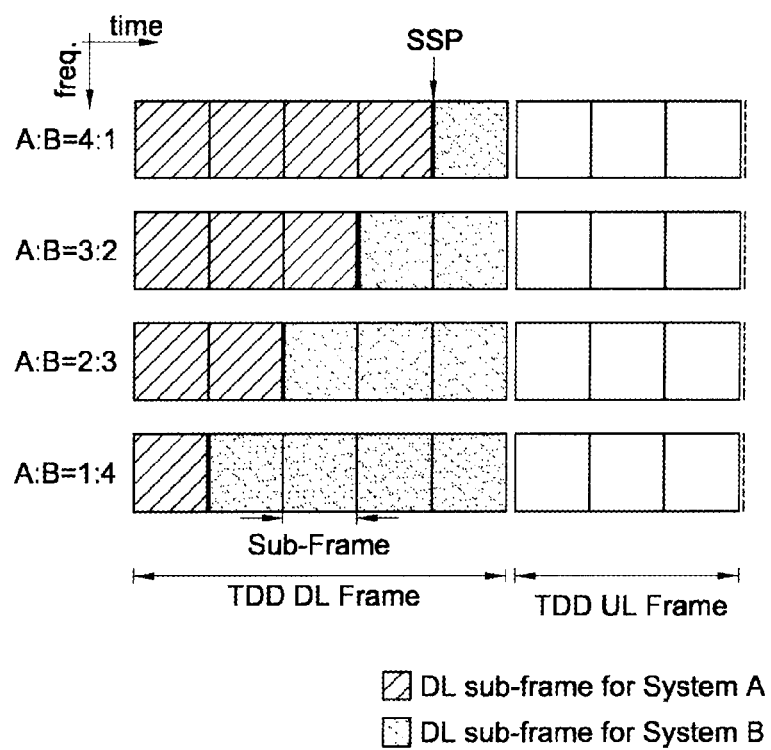
FIG. 4 shows an example of a frame supporting heterogeneous systems.

FIG. 4 shows an example of a frame supporting heterogeneous systems. In this case, a system A and a system B use a TDD scheme.

Referring to FIG. 4, the frame includes a DL frame and a UL frame. In the TDD scheme, the DL frame temporally precedes the UL frame. The DL frame and the UL frame include a plurality of sub-frames. The sub-frame includes the plurality of OFDM symbols. The plurality of sub-frames are used as sub-frames for the system A and sub-frames for the system B. That is, the DL frame and the UL frame include the sub-frames for the system A and the sub-frames for the system B in a specific ratio. It is assumed that all sub-frames for the system A in the DL frame or the UL frame are referred to as a resource region for the system A, and all sub-frames for the system B are referred to as a resource region for the system B. The sub-frame is a minimum unit of determining a ratio of a radio resource allocated for the system A to a radio resource allocated for the system B in the DL frame or the UL frame.

For explanation, it is assumed that the DL frame include 5 sub-frames, and the UL frame include 3 sub-frames. In the DL frame, A:B which is a ratio of the sub-frames for the system A to the sub-frames for the system B can be defined variously such as 4:1, 3:2, 2:3, 1:4. A boundary between the sub-frame for the system A and the sub-frame for the system B is referred to as a system switching point (SSP). A resource allocation method depending on a system may change when the SSP is used as the boundary in the frame. For example, when using the SSP as the boundary, a permutation rule such as PUSC, FUSC, AMC, etc., may be used in the resource region for the system A, and a newly defined permutation rule may be used in the resource region for the system B. A position of the SSP in the frame may change depending on a change of a ratio of the sub-frame for the system A to the sub-frame for the system B.

Figure 5:
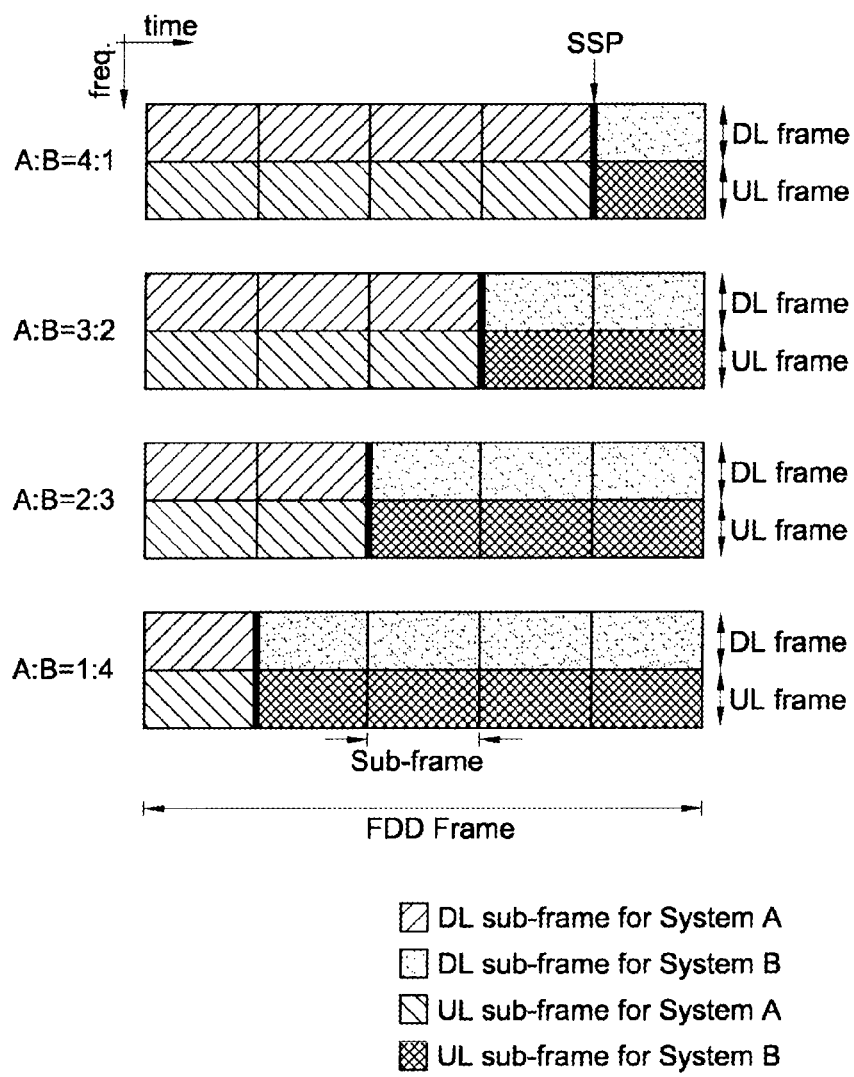
FIG. 5 shows another example of a frame supporting heterogeneous systems.

FIG. 5 shows another example of a frame supporting heterogeneous systems. In this case, a system A and a system B use an FDD scheme.

Referring to FIG. 5, the frame is an FDD-type frame in which a DL frame and a UL frame are divided in a frequency domain. The DL frame and the UL frame are multiplexed using a TDM scheme in which a sub-frame for the system A and a sub-frame for the system B are divided temporally. When each of the DL frame and the UL frame includes 5 sub-frames, A:B which is a ratio of the sub-frame for the system A to the sub-frame for the system B can be defined variously such as 4:1, 3:2, 2:3, 1:4.

Meanwhile, when the sub-frame for the system A and the sub-frame for the system B are multiplexed using the TDM scheme in the DL frame, the sub-frames may be multiplexed using the FDM scheme in the UL frame.

Figure 6:
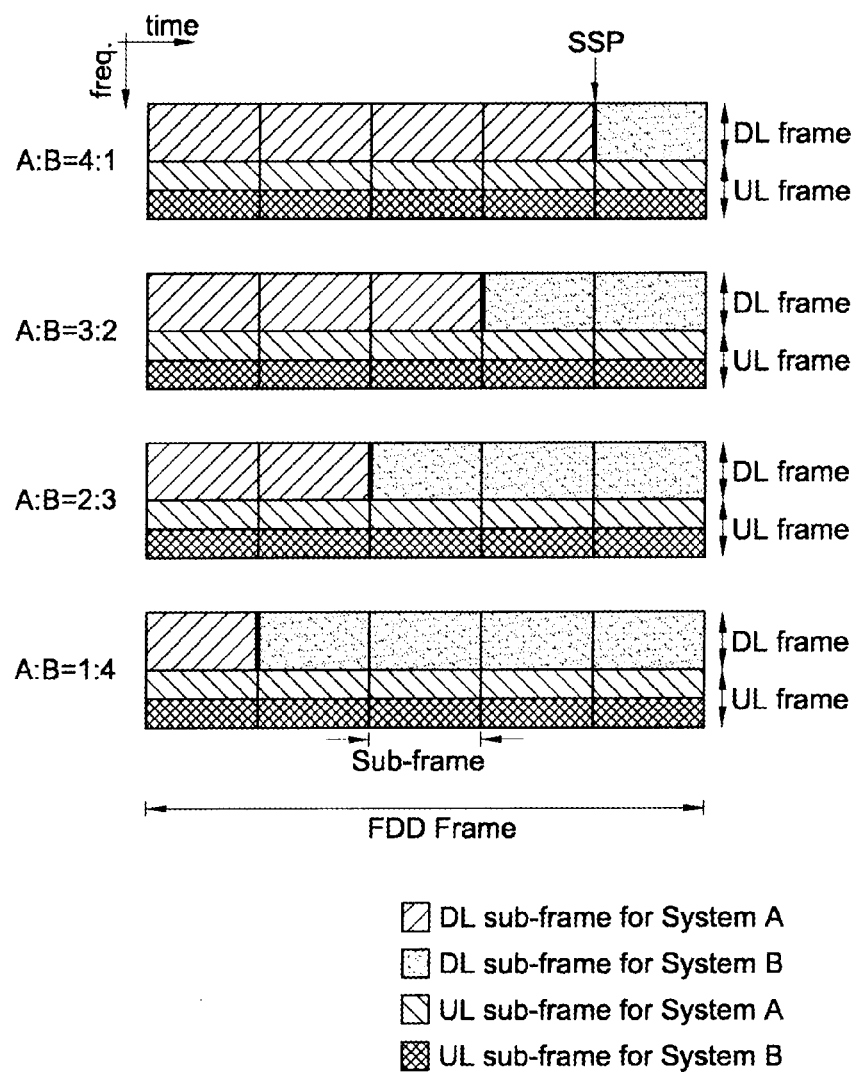
FIG. 6 shows another example of a frame supporting heterogeneous systems.

FIG. 6 shows another example of a frame supporting heterogeneous systems. In this case, regarding an FDD-type frame, a sub-frame for a system A and a sub-frame for a system B are multiplexed using an FDM scheme in a UL frame.

Referring to FIG. 6, the frame is an FDD-type frame in which a DL frame and a UL frame are divided in a frequency domain. In the DL frame, the DL sub-frame for the system A and the DL sub-frame for the system B are multiplexed using a TDM scheme in which the sub-frames are divided temporally. On the other hand, in the UL frame, the UL sub-frame for the system A and the UL sub-frame for the system B are multiplexed using the FDM scheme in which the sub-frames are divided spectrally.

When the DL frame includes 5 sub-frames, A:B which is a ratio of the DL sub-frame for the system A to the DL sub-frame for the system B in the DL frame can be defined variously such as 4:1, 3:2, 2:3, 1:4. In the DL frame, a position of SSP changes according to the ratio of the DL sub-frame for the system A to the DL sub-frame for the system B. Since the UL sub-frame for the system A and the UL sub-frame for the system B are multiplexed using the FDM scheme in the UL frame, the number of UL sub-frames for the system A is equal to the number of UL sub-frames for the system B.

Figure 7:
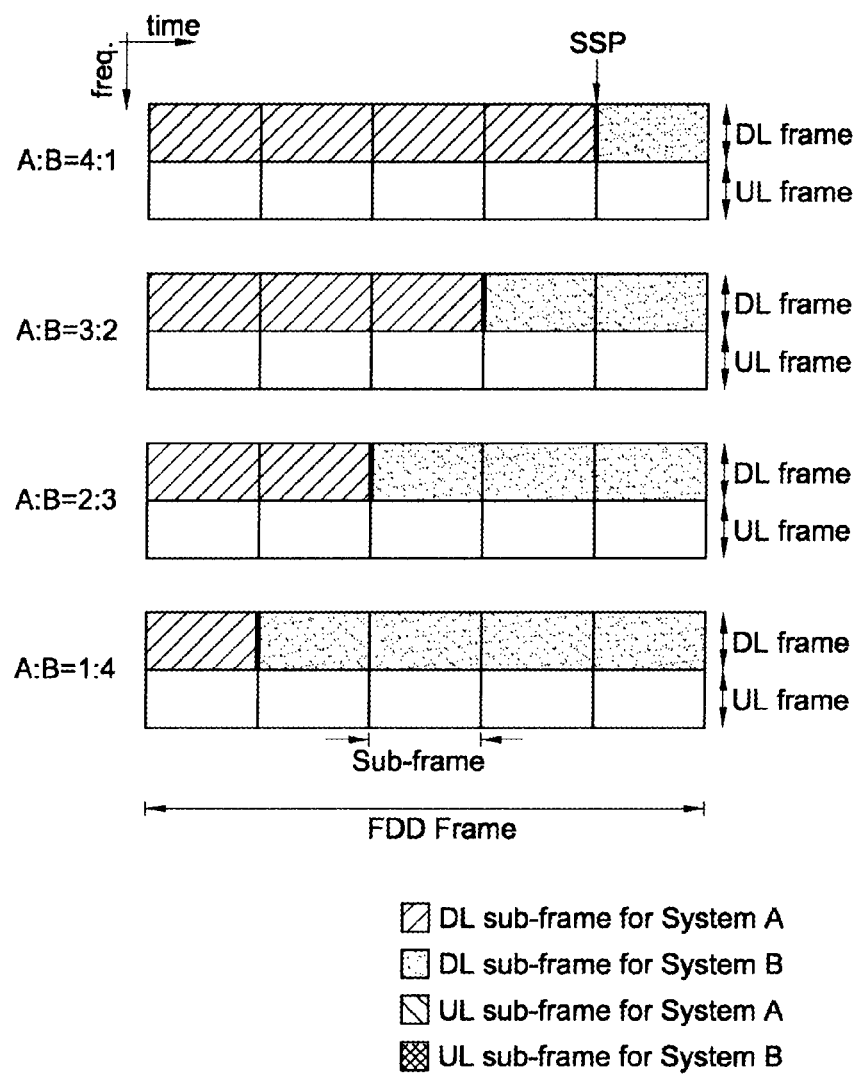
FIG. 7 shows another example of a frame supporting heterogeneous systems.

FIG. 7 shows another example of a frame supporting heterogeneous systems. In this case, there is no restriction on a UL frame in an FDD-type frame.

Referring to FIG. 7, in the FDD-type frame of FIG. 5, the number of sub-frames for a system A and the number of sub-frames for a system B are defined to be equal to each other in a DL frame and a UL frame. That is, an SSP is equally applied in the DL frame and the UL frame. However, in the FDD-type frame of FIG. 6, the UL sub-frame for the system A and the UL sub-frame for the system B are multiplexed using an FDM scheme, and the SSP is applied only in the DL frame.

As such, in the FDD-type frame, the number of sub-frames for the system A and the number of sub-frames for the system B may be determined to be different from each other in the DL frame and the UL frame, and thus the position of SSP may be determined differently. In the UL frame, a method of multiplexing the sub-frame for the system A and the sub-frame for the system B may not be limited, and when considering only the DL frame, the FDD frame can be represented as illustrated. In this case, the position of SSP changes according to a ratio of the DL sub-frame for the system A to the DL sub-frame for the system B in the DL frame.

Figure 8:
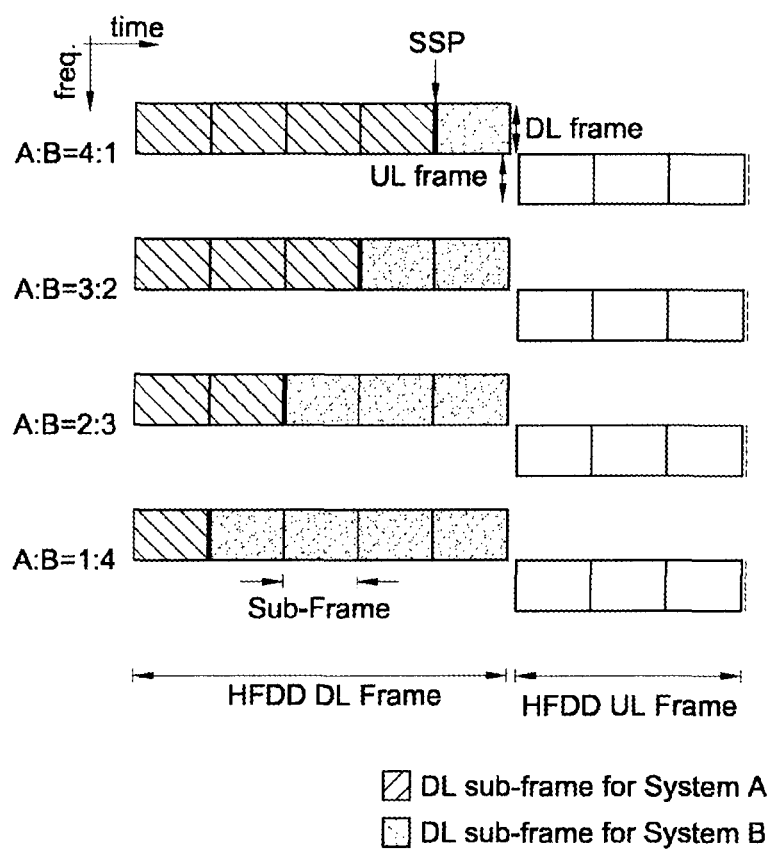
FIG. 8 shows another example of a frame supporting heterogeneous systems.

FIG. 8 shows another example of a frame supporting heterogeneous systems. In this case, a system A and a system B use an H-FDD scheme.

Referring to FIG. 8, since the H-FDD scheme performs DL transmission and UL transmission at different times by using different frequency bands, a DL frame and a UL frame occupy different frequency regions and different time regions. In the DL frame, the DL sub-frame for the system A and the DL sub-frame for the system B can be multiplexed with various ratios by using a TDM scheme, and a position of SSP is determined according to the ratios. In the UL frame, a sub-frame multiplexing scheme is not particularly limited.

Figure 9:
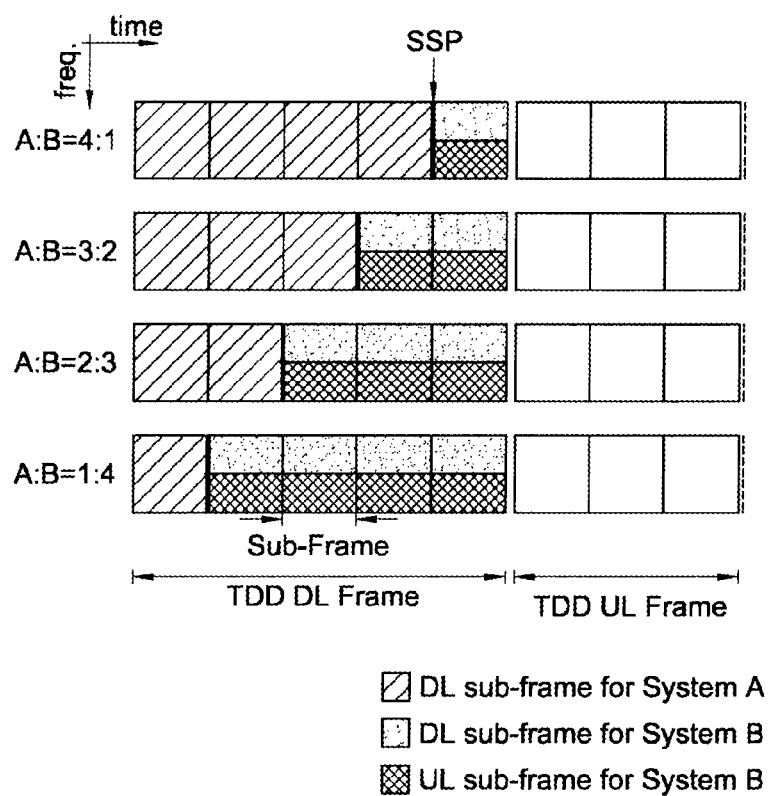
FIG. 9 shows another example of a frame supporting heterogeneous systems.

FIG. 9 shows another example of a frame supporting heterogeneous systems. In this case, a system A uses a TDD scheme, and a system B uses an FDD scheme.

Referring to FIG. 9, since the system A uses the TDD scheme, DL and UL frames of the system A are divided in a time domain. Since the system B uses the FDD scheme, DL and UL frames of the system B are divided in a frequency domain. The DL sub-frame for the system A and the DL/UL sub-frame for the system B can be multiplexed using a TDM scheme in the DL frame. A ratio of the DL sub-frame for the system A and the DL sub-frame for the system B can be defined variously. Since the system B uses the FDD scheme, the number of DL sub-frames for the system B is equal to the number of UL sub-frames for the system B. In the UL frame, a sub-frame multiplexing scheme is not particularly limited.

In the above description, a transmission scheme in which DL transmission and UL transmission are divided in a time domain or a frequency domain may be used identically or differently in the system A and the system B. In addition to the aforementioned transmission scheme, (A, B) which is a combination of a transmission scheme of the system A and a transmission scheme of the system B can be applied variously such as (FDD, TDD), (H-FDD, FDD), (H-FDD, TDD), (FDD, H-FDD), (TDD, H-FDD), etc., and the system A and the system B can be multiplexed according to the aforementioned scheme.

Figure 10:
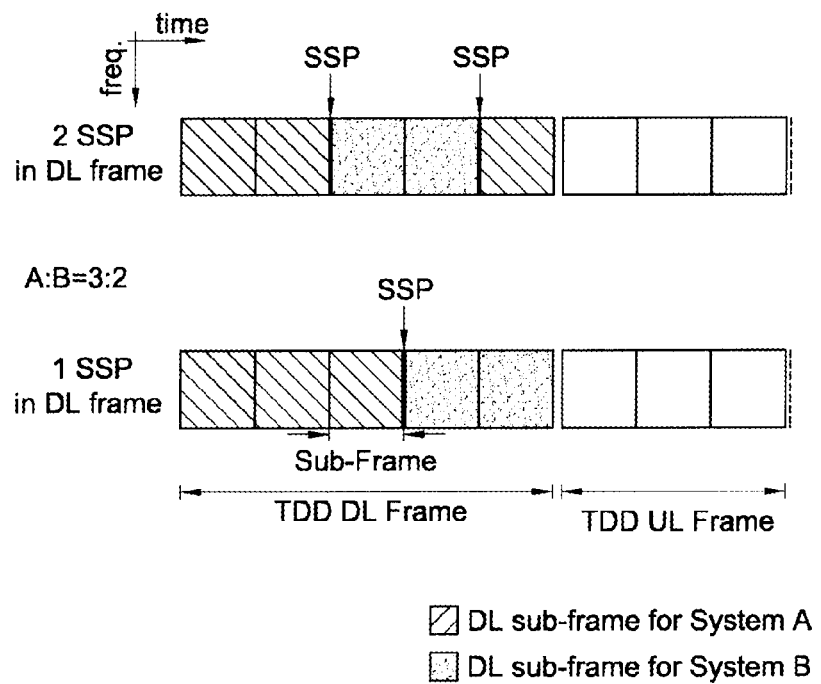
FIG. 10 shows another example of a frame supporting heterogeneous systems.

FIG. 10 shows another example of a frame supporting heterogeneous systems. In this case, the number of system switching points (SSPs) changes when a ratio of a sub-frame for the system A to a sub-frame for the system B is constant.

Referring to FIG. 10, it is assumed that A:B which is a ratio of a DL sub-frame for the system A to a DL sub-frame for the system B is 3:2 in a DL frame including 5 sub-frames. The number of SSPs may differ depending on arrangement of the DL sub-frame for the system A and the DL sub-frame for the system B. When sub-frames for the same system are arranged consecutively, one SSP is provided for the system A and the system B in the DL frame. However, when the sub-frames for the same system are distributed and thus the sub-frames for the system A and the system B are multiplexed in the arrangement, two or more SSPs are present in the DL frame.

When switching between systems occurs frequently in one frame, a parameter for the systems has to change frequently. This may result in the increase of complexity of an algorithm and the increase of system overhead, thereby deteriorating transmission efficiency. Therefore, there is a need to minimize the number of SSPs in one frame. That is, it is preferable to have one SSP by arranging the sub-frame for the system A and the sub-frame for the system B consecutively in a frame supporting the system A and the system B.

Now, a method of allocating essential control information in a frame supporting two or more systems will be described. In a frame supporting a system A and a system B, it is assumed that essential control information of the system A is allocated to a DL sub-frame for the system A, and essential control information of the system B is allocated to a DL sub-frame for the system B. The essential control information is control information that must be acquired by a UE using a corresponding system. For example, the essential control information may be control information that must be acquired to perform initial cell search performed initially after the UE is powered on or non-initial cell search for performing handover or neighbor cell measurement. Examples of the essential control information include a preamble, an FCH, a DL-MAP/UL-MAP, etc. In addition thereto, the essential control information may be system information, synchronization information, or the like which is broadcast. Since the essential control information is transmitted through a DL frame from a BS to a UE, a multiplexing scheme of the heterogeneous systems is not limited in the UL frame. In the UL frame, the heterogeneous systems can be multiplexed using various schemes, such as a TDM scheme, an FDM scheme, a CDM scheme, etc.

Figure 11:
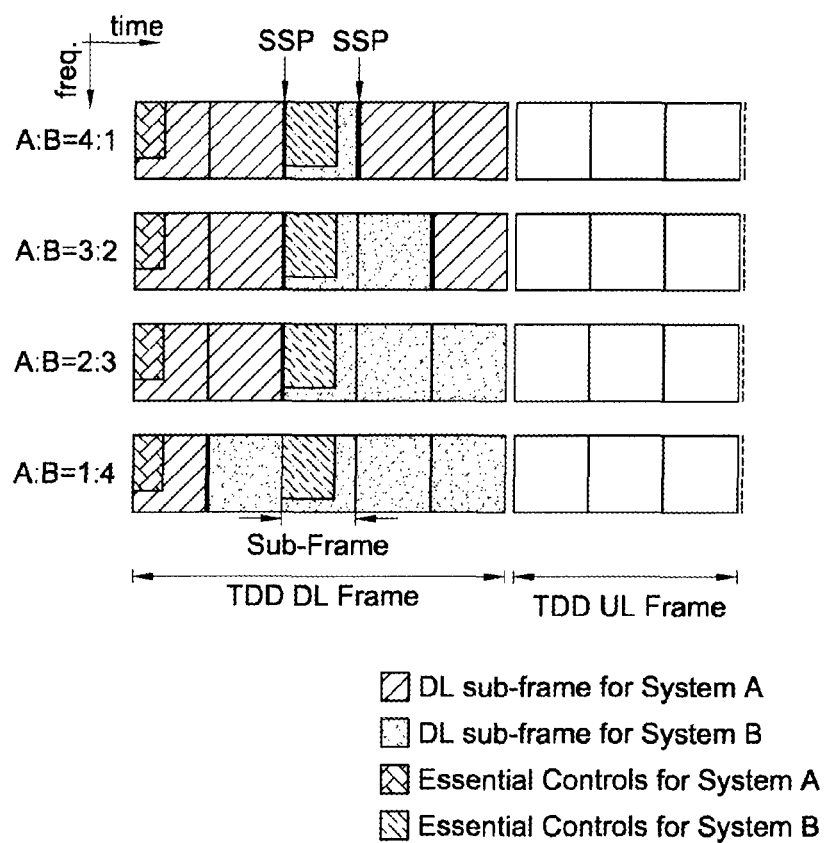
FIG. 11 shows an example of control information in a frame supporting heterogeneous systems.

FIG. 11 shows an example of control information in a frame supporting heterogeneous systems. In this case, essential control information of a system A and essential control information of a system B are allocated in a fixed position in a frame in which the system A and the system B use a TDD scheme.

Referring to FIG. 11, when a DL frame includes 5 sub-frames, it is assumed that the essential control information of the system A is allocated to a first DL sub-frame, and the essential control information of the system B is fixedly allocated to a third DL sub-frame. Since each essential control information has to be allocated in a DL sub-frame of a corresponding system, the first DL sub-frame to which the essential control information of the system A is allocated is always a DL sub-frame for the system A, and the third DL sub-frame to which the essential control information of the system B is allocated is always a DL sub-frame for the system B. If A:B which is a ratio of the DL sub-frame for the system A to the DL sub-frame for the system B is 4:1 or 3:2, two SSPs are present, and if A:B is 2:3 or 1:4, one SSP is present.

When the essential control information of the system A and the essential control information of the system B are allocated in a fixed position in the frame, a position of the essential control information does not change even if there is a change in the ratio of the DL sub-frame for the system A to the DL sub-frame for the system B. Therefore, a UE does not have to be informed of a specific offset value to indicate the position of the essential control information. In addition, it is possible to solve a problem in that the UE has to re-perform an initial network entry process in order to acquire the essential control information.

For example, in a DL frame having one SSP, it is assumed that the essential control information of the system A is allocated fixedly to the first sub-frame, whereas the essential control information of the system B is allocated to a sub-frame adjacent to the SSP. As the ratio of the DL sub-frame for the system A to the DL sub-frame for the system B changes, the position of the essential control information of the system B changes. In this case, the position of the essential control information of the system B has to be informed by using the specific offset value according to the essential control information of the system A. If the position of the essential control information of the system B is not indicated by the offset value, the UE has to re-perform the initial network entity process in order to acquire the essential control information of the system B. This may be a cause of delaying a process which is performed by the UE to acquire the essential control information of the system B. Such a problem does not occur when the essential control information of the system A and the system B is allocated in a fixed position in the DL frame.

Figure 12:
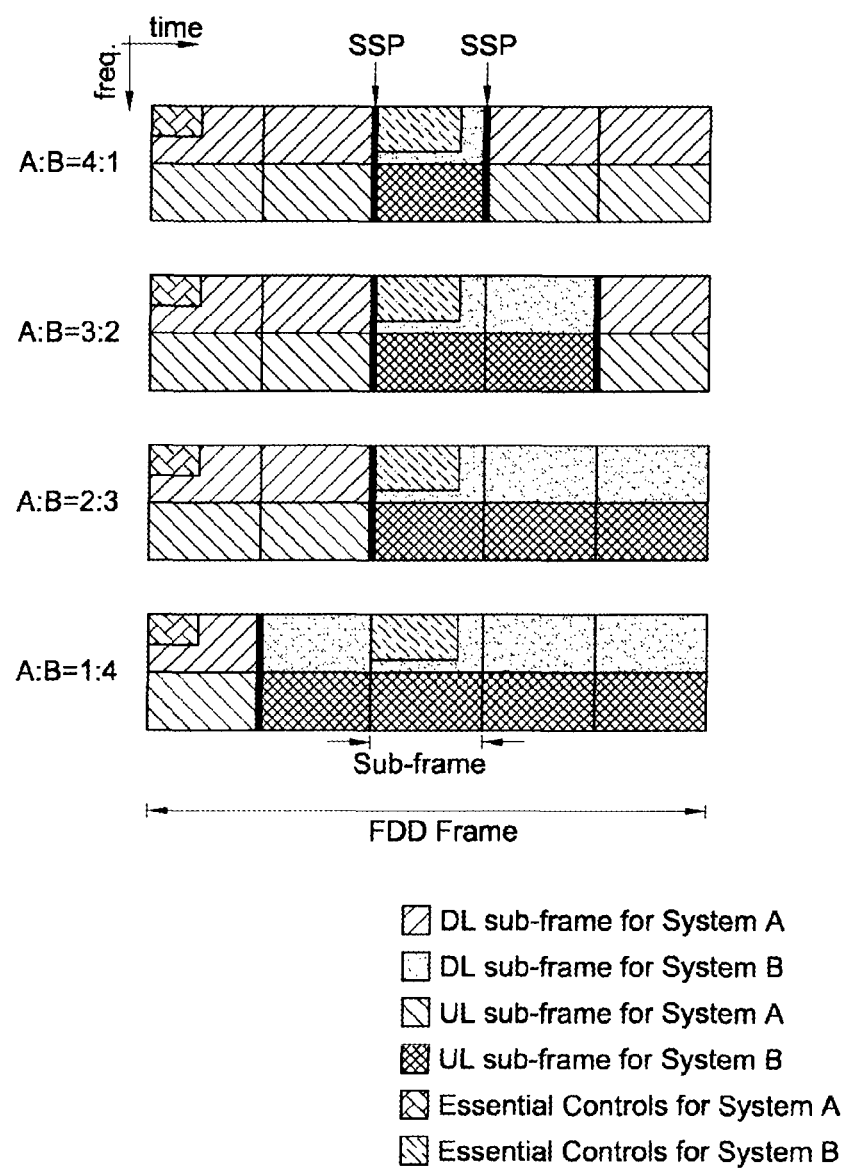
FIG. 12 shows another example of control information in a frame supporting heterogeneous systems.

FIG. 12 shows another example of control information in a frame supporting heterogeneous systems. In this case, essential control information of a system A and essential control information of a system B are allocated in a fixed position in a frame in which the system A and the system B use an FDD scheme.

Referring to FIG. 12, when a DL frame includes 5 sub-frames in an FDD frame, it is assumed that the essential control information of the system A is allocated to a first DL sub-frame, and the essential control information of the system B is fixedly allocated to a third DL sub-frame. If A:B which is a ratio of the DL sub-frame for the system A to the DL sub-frame for the system B is 4:1 or 3:2, two SSPs are present, and if A:B is 2:3 or 1:4, one SSP is present. Since a position of the essential control information does not change even if the ratio of the DL sub-frame for the system A to the DL sub-frame for the system B changes, a UE does not have to be informed of a specific offset value to indicate the position of the essential control information, and the UE does not have to re-perform an initial network entry process to acquire the essential control information.

However, when the essential control information of the system B is allocated fixedly to the third DL sub-frame among the 5 DL sub-frames, there is a case where two SSPs are present according to the ratio of the DL sub-frame for the system A to the DL sub-frame for the system B. When it is determined to use a plurality of SSPs in one frame, frequent shifting between the systems results in the increase of complexity of an algorithm and the decrease of system efficiency. Therefore, it is preferable to minimize the number of SSPs while allocating the essential control information in the frame.

Figure 13:
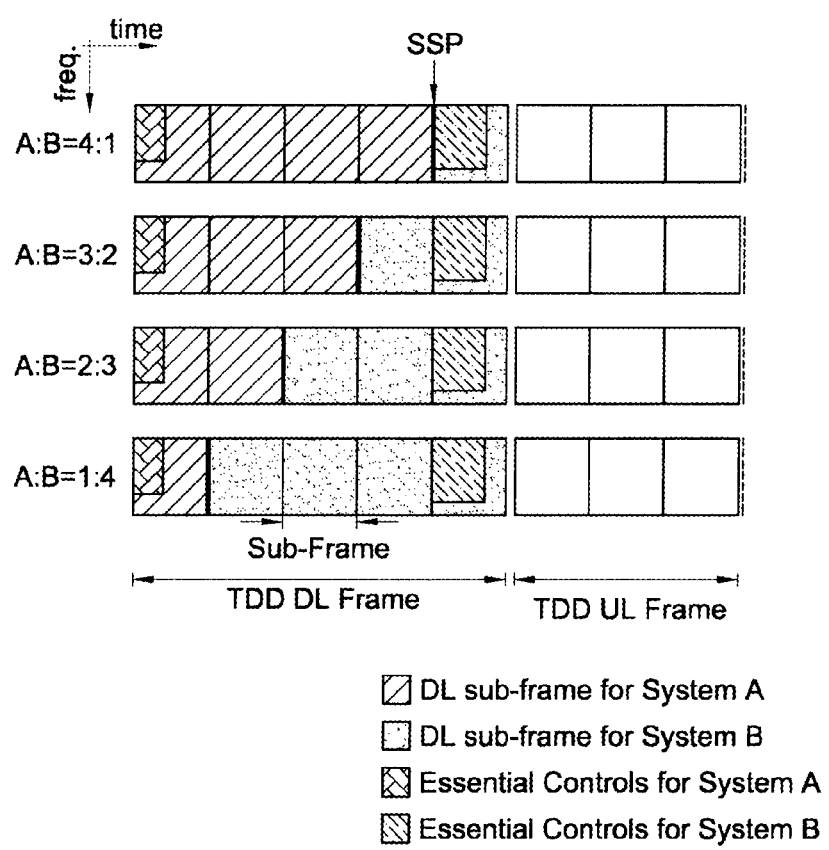
FIG. 13 shows another example of control information in a frame supporting heterogeneous systems.

FIG. 13 shows another example of control information in a frame supporting heterogeneous systems. In this case, essential control information of a system B is allocated fixedly to a temporally last sub-frame of a DL frame in a frame in which a system A and the system B use a TDD scheme.

Referring to FIG. 13, when the DL frame includes 5 sub-frames, essential control information of the system A is allocated to a first DL sub-frame, and the essential control information of the system B is allocated to a fifth DL sub-frame, i.e., fixedly allocated to a temporally last DL sub-frame. The essential control information of the system A and the essential control information of the system B are respectively allocated to DL sub-frames located at both ends of the DL frame. In a TDD-type frame, the essential control information of the system B is allocated to a DL sub-frame adjacent to a transmit/receive transition gap (TTG) which is a guard time between the DL frame and the UL frame.

As such, when the essential control information of the system A and the essential control information of the system B are allocated to the DL sub-frames located at both ends of the fixed DL frame, the number of SSPs can be maintained to one always even if a ratio of the DL sub-frame for the system A and the DL sub-frame for the system B changes. Therefore, a UE does not have to be informed of a specific offset value to indicate a position of the essential control information, and the increase of complexity of an algorithm due to frequent shifting of the systems can be avoided.

Figure 14:
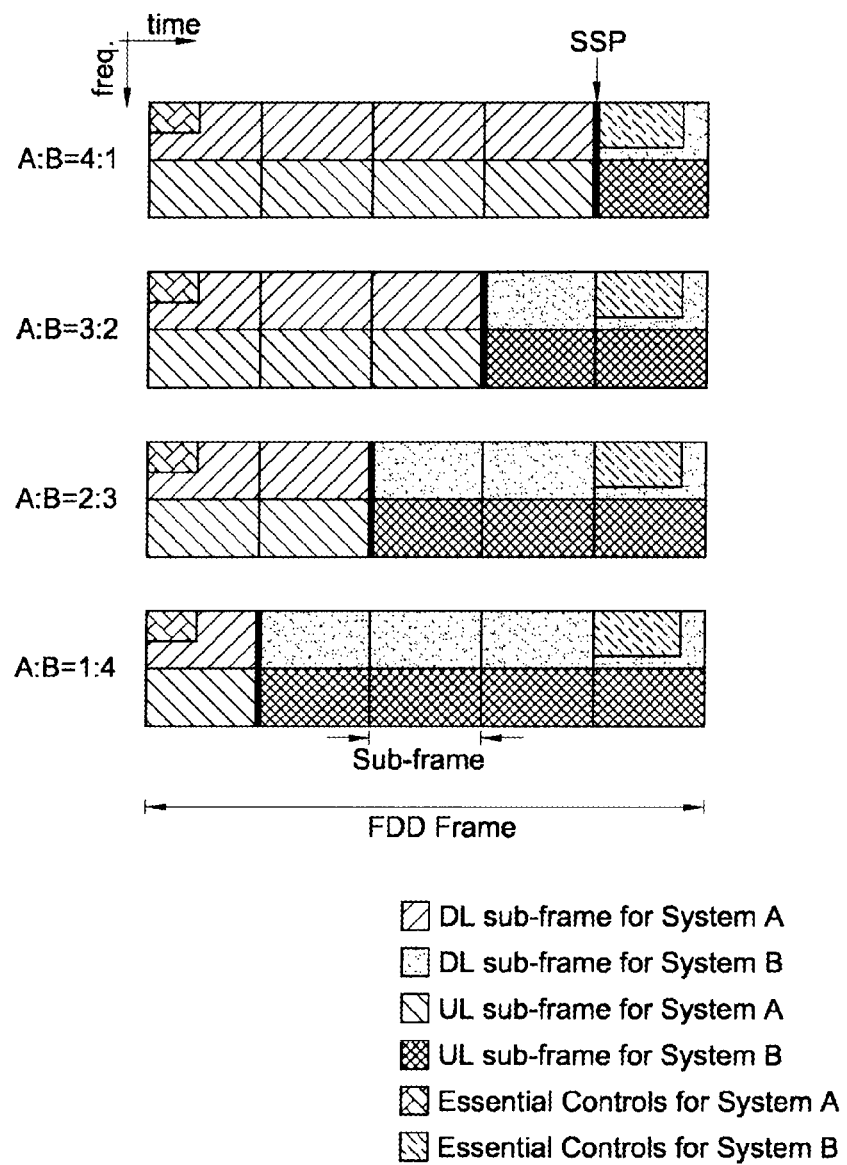
FIG. 14 shows another example of control information in a frame supporting heterogeneous systems.

FIG. 14 shows another example of control information in a frame supporting heterogeneous systems. In this case, in a frame in which a system A and a system B use an FDD scheme, essential control information of the system B is allocated fixedly to a temporally last sub-frame in a DL frame.

Referring to FIG. 14, when essential control information of the system A and the essential control information of the system B are respectively allocated to DL sub-frames located at both ends of the DL frame, the number of SSPs can be maintained to one always in a frame in which the system A and the system B use an FDD scheme even if a ratio of the DL sub-frame for the system A to the DL sub-frame for the system B changes. Therefore, a UE does not have to be informed of a specific offset value to indicate a position of the essential control information, and the increase of complexity of an algorithm due to frequent shifting of the systems can be avoided.

Figure 15:
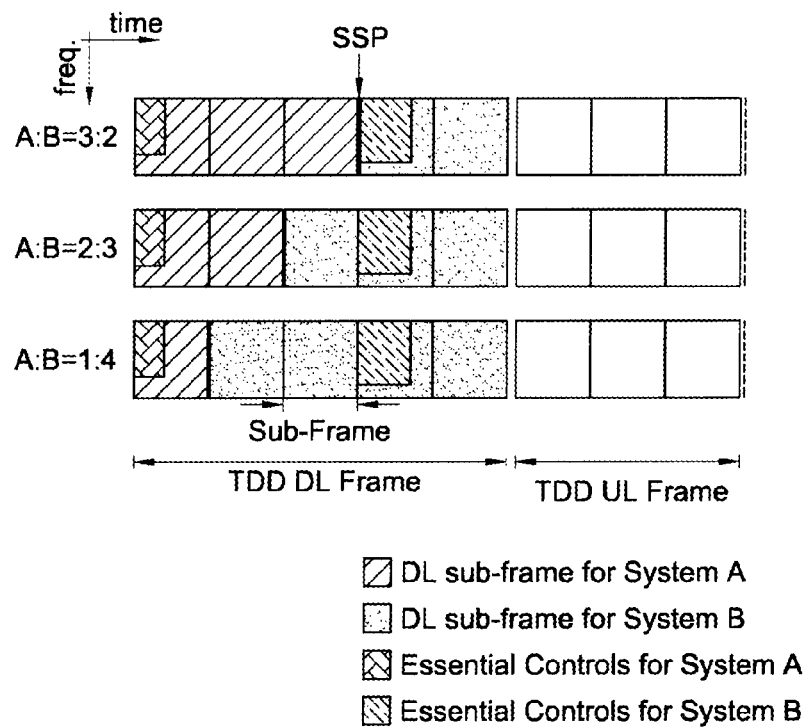
FIG. 15 shows another example of control information in a frame supporting heterogeneous systems.

FIG. 15 shows another example of control information in a frame supporting heterogeneous systems. In this case, essential control information is allocated in a fixed position in a TDD frame by considering a variation range of a ratio of a DL sub-frame for a system A to a DL sub-frame for a system B.

Referring to FIG. 15, when a DL frame of a frame in which the system A and the system B use a TDD scheme includes 5 sub-frames, it is assumed that A:B which is a ratio of a DL sub-frame for the system A to a DL sub-frame for the system B changes with a variation range of 3:2, 2:3, and 1:4. The number of DL sub-frames for the system is in the range of 1 to 3, and the number of DL sub-frames for the system B is in the range of 2 to 4.

The essential control information of the system B is allocated fixedly to a position separated from a last DL sub-frame of the DL frame by a minimum number of DL sub-frames for the system B. Since at least two DL sub-frames are allocated for the system B, the essential control information of the system B is allocated fixedly to a second last DL sub-frame from a last DL sub-frame of the DL frame. The essential control information of the system A may always be allocated fixedly to a first DL sub-frame, or may be allocated fixedly to a DL sub-frame separated from a first DL sub-frame by a minimum number of DL sub-frames for the system A.

As such, the number of SSPs can always be maintained to one by fixedly allocating the essential control information of the system B to a DL sub-frame separated from a last DL sub-frame by a minimum number of DL sub-frames for the system B. Therefore, an advantage of allocating the essential control information in a fixed position and an advantage of minimizing the number of SSPs can be both achieved.

Figure 16:
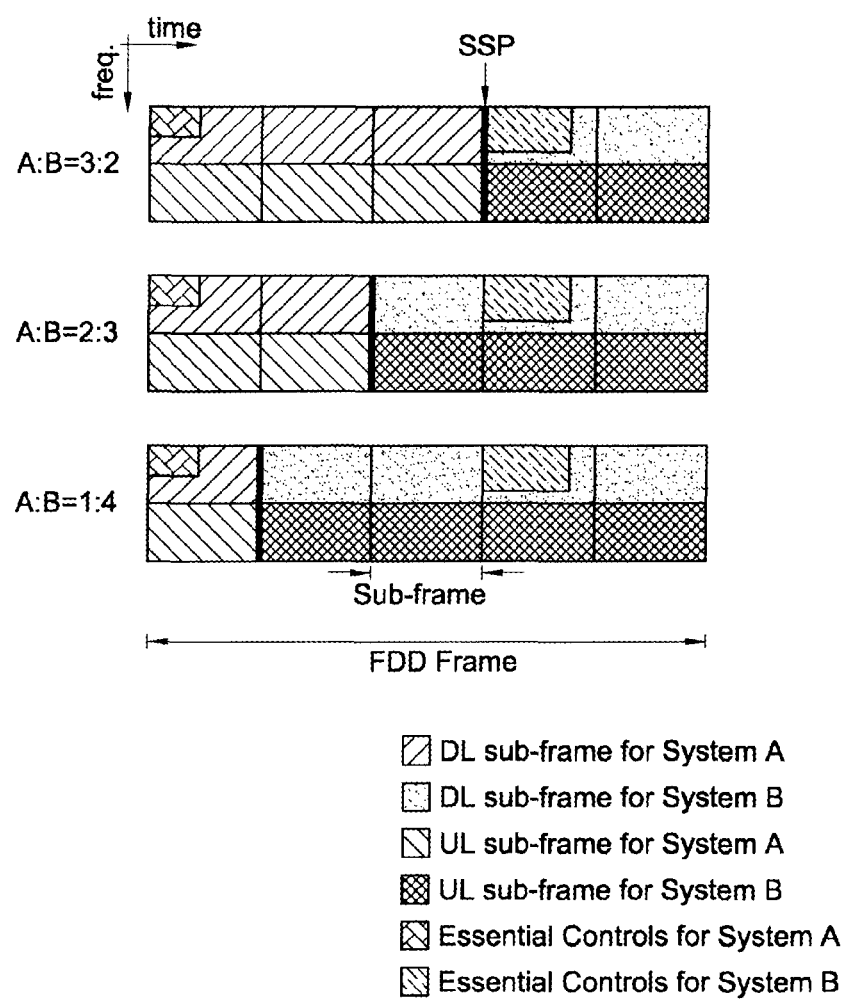
FIG. 16 shows another example of control information in a frame supporting heterogeneous systems.

FIG. 16 shows another example of control information in a frame supporting heterogeneous systems. In this case, essential control information is allocated in a fixed position in an FDD frame by considering a variation range of a ratio of a DL sub-frame for a system A to a DL sub-frame for a system B.

Referring to FIG. 16, in a frame in which the system A and the system B use the FDD scheme, the number of SSPs can always be maintained to one by fixedly allocating the essential control information of the system B to a DL sub-frame separated from a last DL sub-frame by a minimum number of DL sub-frames for the system B. The essential control information of the system A may always be allocated fixedly to a first DL sub-frame, or may be allocated fixedly to a DL sub-frame separated from a first DL sub-frame by a minimum number of DL sub-frames for the system A. Therefore, an advantage of allocating the essential control information in a fixed position and an advantage of minimizing the number of SSPs can be both achieved.

Figure 17:
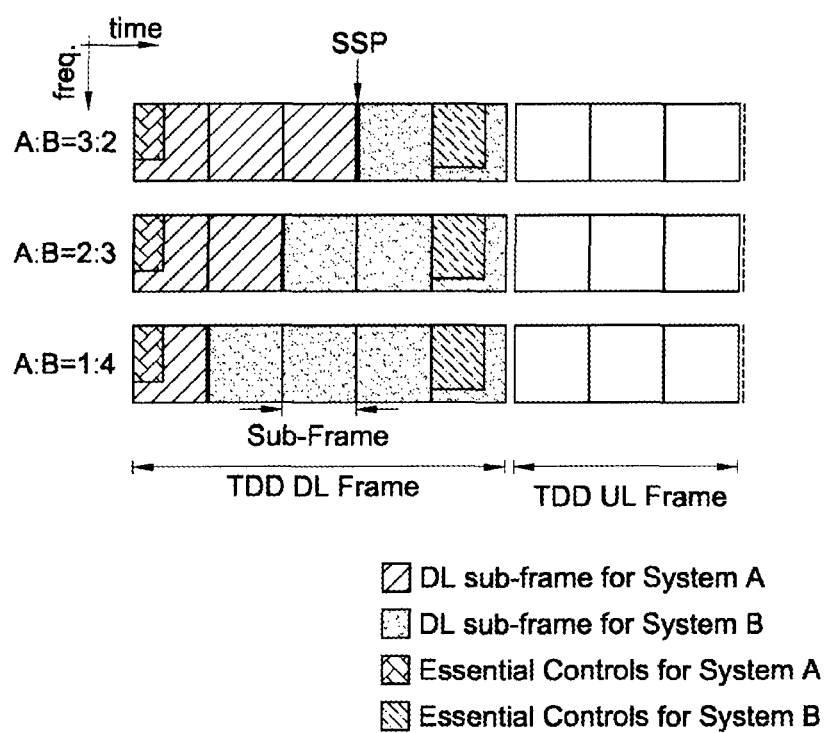
FIG. 17 shows another example of control information in a frame supporting heterogeneous systems.

FIG. 17 shows another example of control information in a frame supporting heterogeneous systems. In this case, essential control information is allocated in a fixed position in a TDD frame without considering a variation range of a ratio of a DL sub-frame for a system A to a DL sub-frame for a system B.

Referring to FIG. 17, in a case where the variation range of the ratio of the DL sub-frame for the system A and the DL sub-frame for the system B is not considered in the TDD frame, essential control information of the system A is allocated fixedly to a first DL sub-frame as shown in FIG. 13, and essential control information of the system B is allocated fixedly to a last DL sub-frame, and thus the number of SSPs can be maintained to one.

Figure 18:
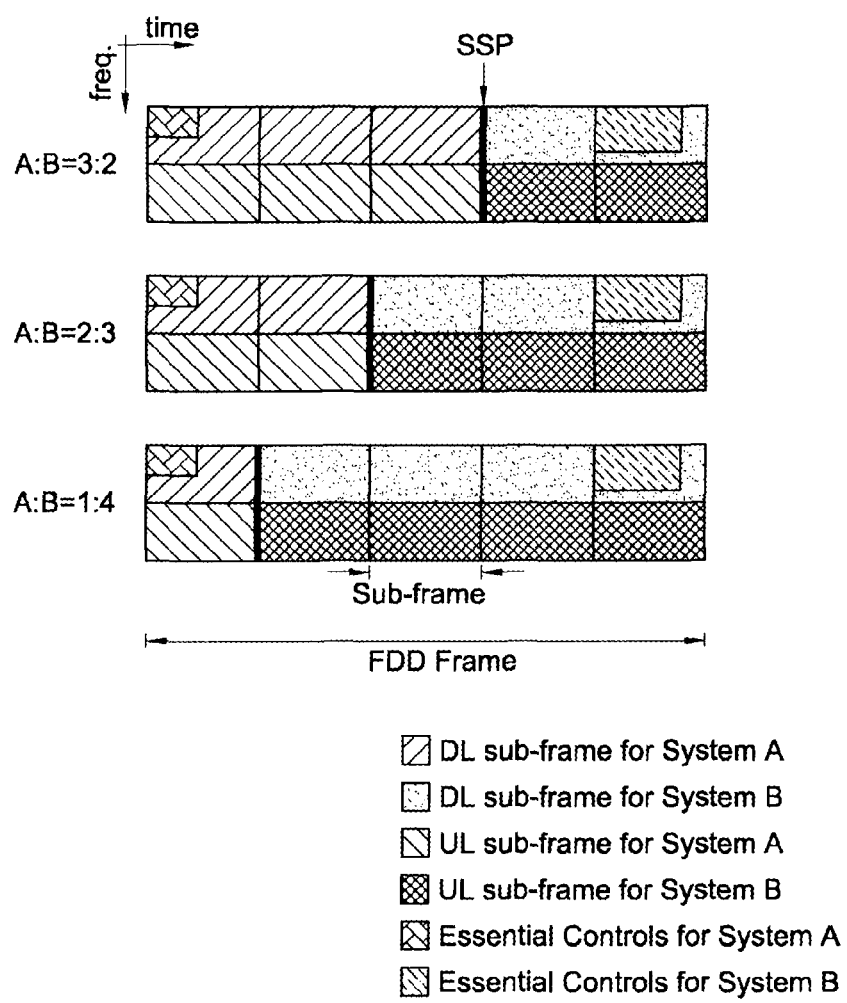
FIG. 18 shows another example of control information in a frame supporting heterogeneous systems.

FIG. 18 shows another example of control information in a frame supporting heterogeneous systems. In this case, essential control information is allocated in a fixed position in an FDD frame without considering a variation range of a ratio of a DL sub-frame for a system A to a DL sub-frame for a system B.

Referring to FIG. 18, in a case where the variation range of the ratio of the DL sub-frame for the system A and the DL sub-frame for the system B is not considered in the FDD frame, essential control information of the system A is allocated fixedly to a first DL sub-frame as shown in FIG. 13, and essential control information of the system B is allocated fixedly to a last DL sub-frame, and thus the number of SSPs can be maintained to one.

Hereinafter, allocation of essential control information in a frame using a complementary grouping and scheduling (CGS)-based H-FDD scheme will be described. The CGS-based H-FDD scheme is for the effective use of a radio resource wasted in the H-FDD scheme in which DL transmission and UL transmission have to be performed at different times by using different frequency bands. First, the CGS-based H-FDD scheme will be described in comparison with an FDD scheme and the H-FDD scheme.

Figure 19:
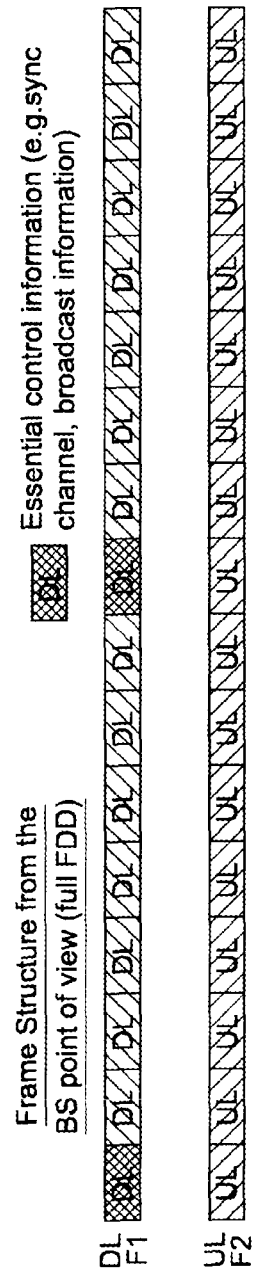
FIG. 19 shows an example of control information in a frequency division duplex (FDD) frame.
Figure 20:
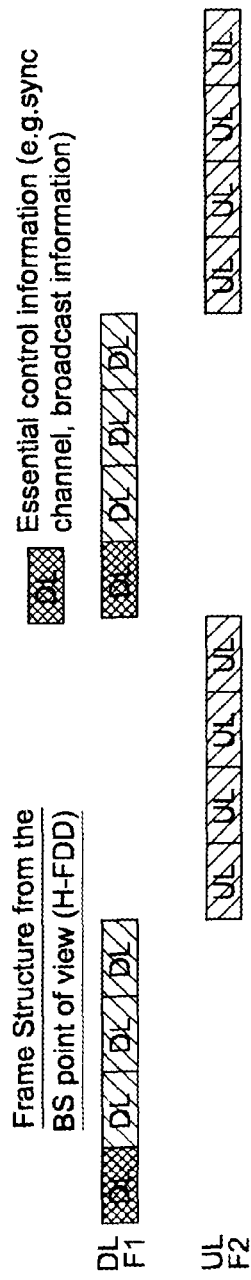
FIG. 20 shows an example of control information in a half-duplex FDD (H-FDD) frame.
Figure 21:
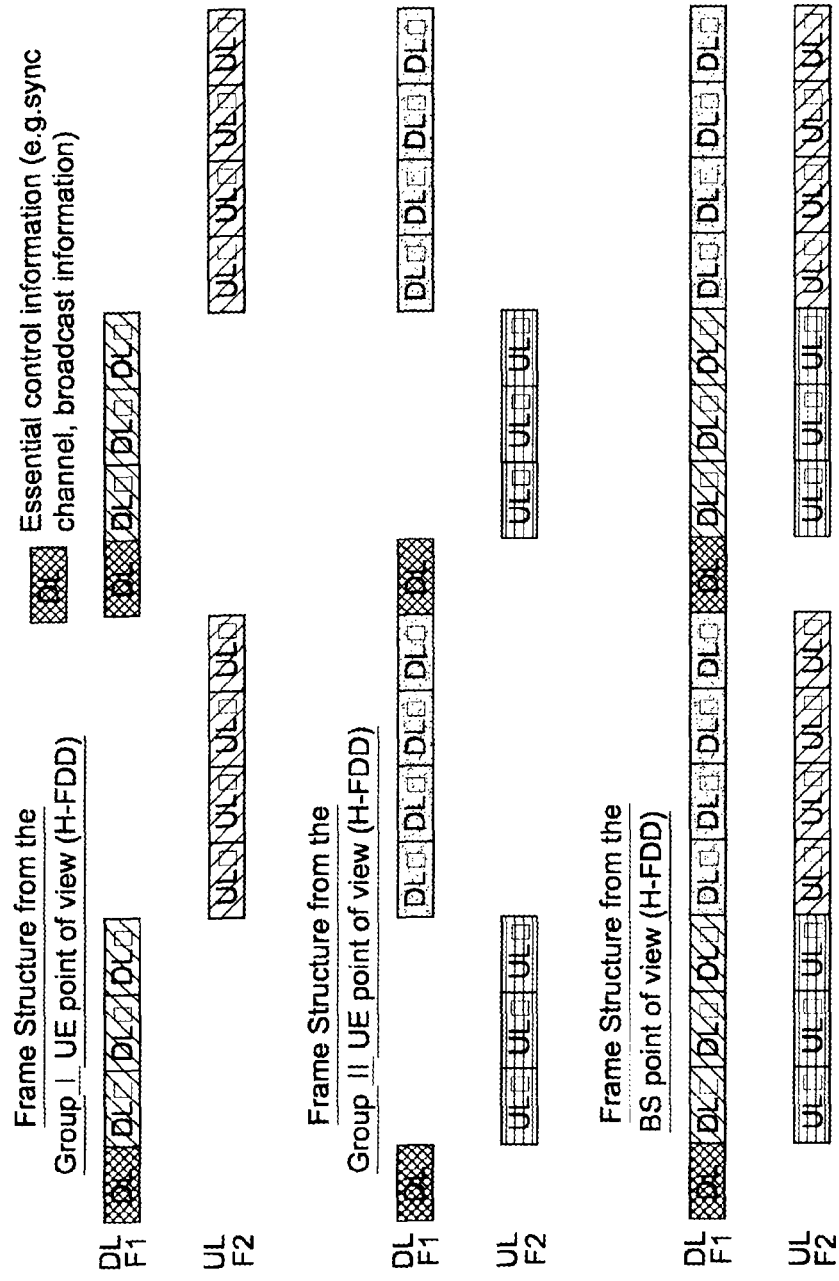
FIG. 21 shows an example of control information on a complementary grouping and scheduling (CGS)-based H-FDD frame.

FIG. 19 shows an example of control information in an FDD frame. FIG. 20 shows an example of control information in an H-FDD frame. FIG. 21 shows an example of control information on a CGS-based H-FDD frame.

Referring to FIG. 19 to FIG. 21, in the FDD-type frame in the viewpoint of a BS, a DL frame and a UL frame are divided in a frequency domain. DL transmission and UL transmission are performed simultaneously by using different frequency bands. Essential control information can be transmitted through sub-frames with a specific spacing in a DL frame.

In the H-FDD-type frame in the viewpoint of the BS, a DL frame and a UL frame are divided in a frequency domain and a time domain. DL transmission and UL transmission are performed at different times by using different frequency bands. Essential control information can be transmitted through sub-frames with a specific spacing in a DL frame. In the H-FDD scheme, since UL transmission cannot be performed while DL transmission is performed, an unused resource region is present, and thus a radio resource is wasted to that extent.

In the CGS-based H-FDD scheme, when UEs are divided into a plurality of groups so that a DL sub-frame is allocated to UEs of a first group, a UL sub-frame is allocated to UEs of a second group, and when a UL sub-frame is allocated to the UEs of the first group, a DL sub-frame is allocated to the UEs of the second group. That is, a DL radio resource and a UL radio resource are alternately allocated to the UEs of the first group and the UEs of the second group. In the viewpoint of the UEs of the first group, the H-FDD scheme in which DL transmission and UL transmission are performed at different frequency bands at different times is satisfied. In addition, the H-FDD scheme is also satisfied in the viewpoint of the second group. In the CGS-based H-FDD scheme, since DL transmission and UL transmission are performed simultaneously in the viewpoint of the BS, a waste of radio resources can be reduced. However, since essential control information has to be received simultaneously by the UEs of the first group and the UEs of the second group, a sub-frame to which the essential control information is allocated is used as the same DL sub-frame by the UEs of the two groups.

Now, allocation of essential control information when a CGS-based H-FDD scheme is applied in a frame supporting heterogeneous systems will be described.

Figure 22:
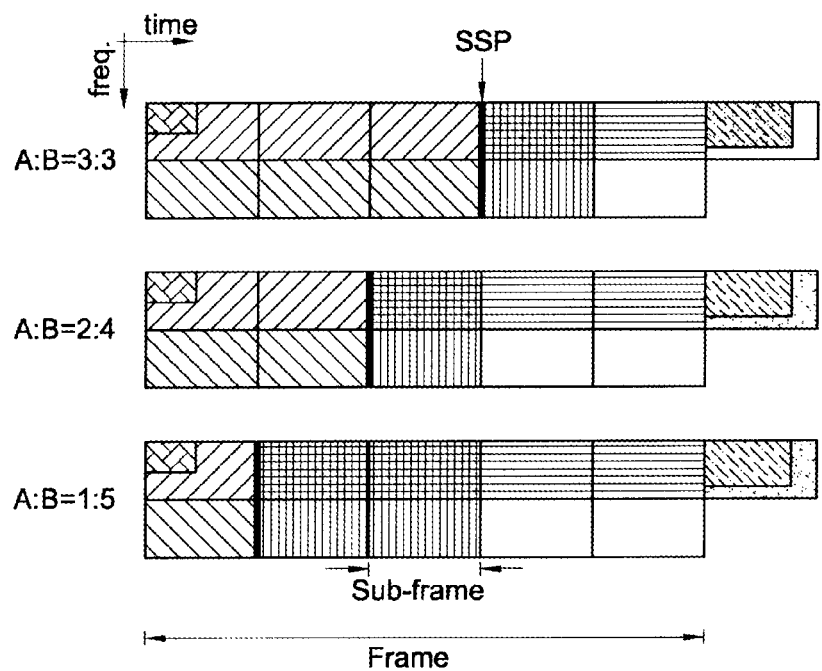
FIG. 22 shows another example of control information in a frame supporting heterogeneous systems.

FIG. 22 shows another example of control information in a frame supporting heterogeneous systems.

Referring to FIG. 22, it is assumed that a system A uses an FDD scheme, and a system B uses a CGS-based H-FDD scheme. Essential control information of the system A is allocated fixedly to a first DL sub-frame in a DL frame, and essential control information of the system B is allocated fixedly to a last DL sub-frame in the DL frame.

Since the system B uses the CGS-based H-FDD scheme, for the remaining sub-frames other than a sub-frame of a time domain to which the essential control information is allocated, a DL sub-frame for a first group of the system B and a UL sub-frame for a second group of the system B are allocated in the same time domain, and a UL sub-frame for the first group of the system B and a DL sub-frame for the second group of the system B are allocated in the same time domain.

As such, by allocating the essential control information of the system B using the CGS-based H-FDD scheme to a last DL sub-frame of the DL frame, the number of SSPs can always be maintained to one even if there is a change in a ratio of a DL sub-frame for the system A to a DL sub-frame for the system B.

In addition thereto, (A, B) which is a combination of a transmission scheme of the system A and a transmission scheme of the system B can be applied variously such as (TDD, CGS-based H-FDD), (CGS-based H-FDD, CGS-based H-FDD), etc. Even in this case, by allocating the essential control information to a last DL sub-frame of a DL frame, the number of SSPs can always be maintained to one irrespective of the ratio of the DL sub-frame for the system A to the DL sub-frame for the system B.

In the aforementioned frame supporting the heterogeneous systems, the system B is multiplexed with respect to the system A. That is, in the aforementioned frame structure, the heterogeneous systems are supported in the viewpoint of the system A. For example, if the system A is a legacy system and the system B is an evolution system, it is assumed that the system A is allocated temporally prior to the system B for backward compatibility in the frame and then the system B is additionally allocated. However, the frame implies a data sequence during a specific time period in a continuous data transmission process, and thus a system that is temporally prior to the other system in the frame may differ depending on a definition on the frame.

Hereinafter, a frame structure supporting heterogeneous systems defined in the viewpoint of each system will be described.

Figure 23:
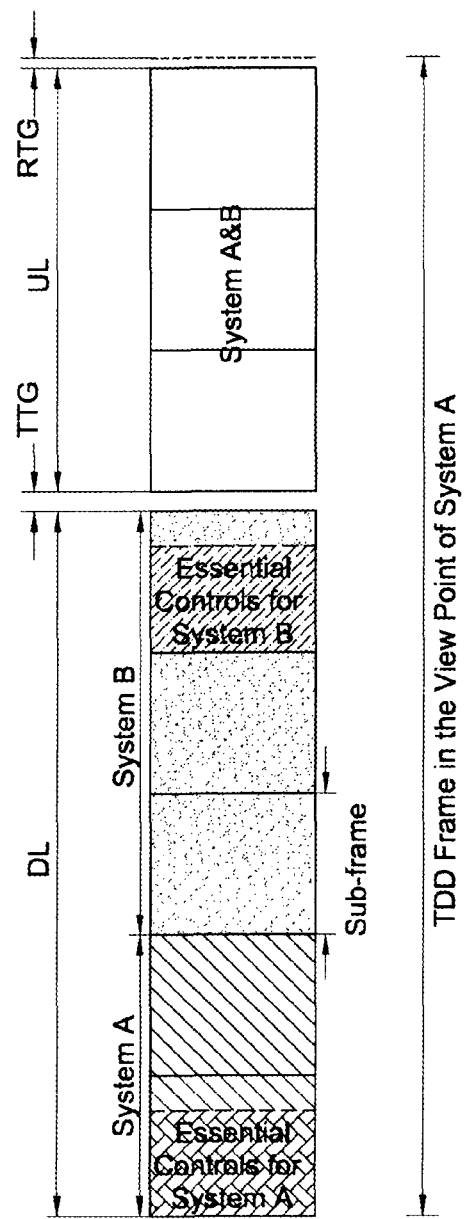
FIG. 23 shows another example of control information in a frame supporting heterogeneous systems.
Figure 24:
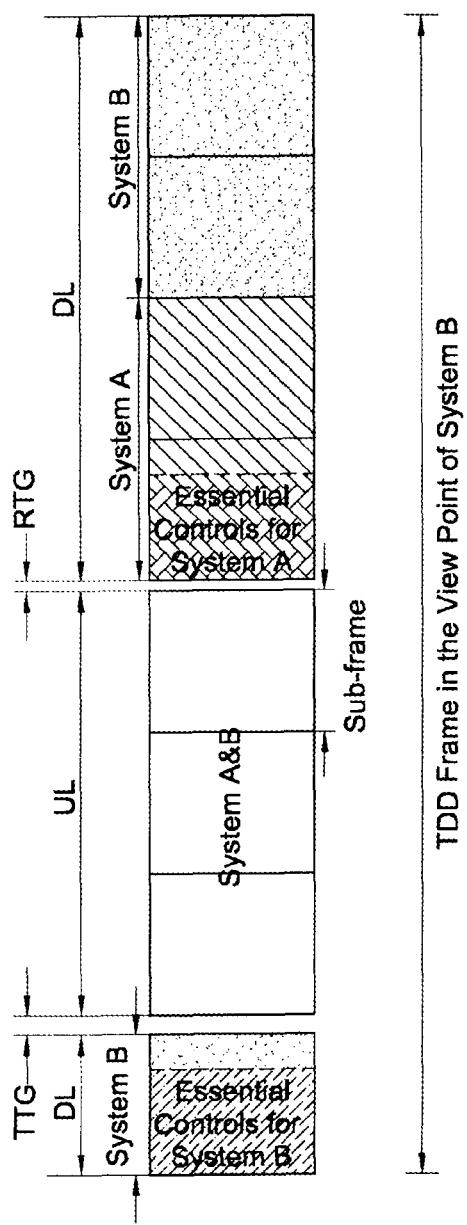
FIG. 24 shows another example of control information in a frame supporting heterogeneous systems.

FIG. 23 shows another example of control information in a frame supporting heterogeneous systems. FIG. 24 shows another example of control information in a frame supporting heterogeneous systems. The frame of FIG. 23 is a TDD frame defined in the viewpoint of a system A. The frame of FIG. 24 is a TDD frame defined in the viewpoint of a system B.

Referring to FIG. 23 and FIG. 24, in a TDD frame defined in the viewpoint of the system A, essential control information of the system A can be defined as a start of a frame, and an RTG (or an idle time) can be defined as an end of the frame. The essential control information of the system A is allocated to a first DL sub-frame, and essential control information of the system B is allocated to a last DL sub-frame.

In a TDD frame defined in the viewpoint of the system B, the essential control information of the system B can be defined as a start of a frame. Subsequent to a DL sub-frame to which the essential control information of the system B is allocated, a UL frame follows with a TTG being located between them. In addition, subsequent to the UL frame, a DL frame starting with a sub-frame to which the essential control information of the system A is allocated follows with an RTG being located between them. An end of the frame can be defined as an end of a last DL sub-frame in a DL frame. Subsequent to the end of the frame, the essential control information of the system follows as a start of a next frame. When considering a relation of contiguous frames, it is the same as when the essential control information of the system A is allocated to a first DL sub-frame in the DL frame and the essential control information of the system B is allocated to a last DL sub-frame in the DL frame. That is, it is the same as when sub-frames in a frame are cyclic shifted so that a DL sub-frame to which the essential control information of the system B is allocated comes first in the frame in the TDD frame defined in the viewpoint of the system A.

Irrespective of whether the TDD frame is defined in the viewpoint of the system A or the TDD frame is defined in the viewpoint of the system B, when cyclic shift is performed so that the essential control information of the system A is allocated to a first DL sub-frame and the essential control information of the system B is allocated to a last DL sub-frame in contiguous DL frames, the number of SSPs can be maintained to one.

Figure 25:
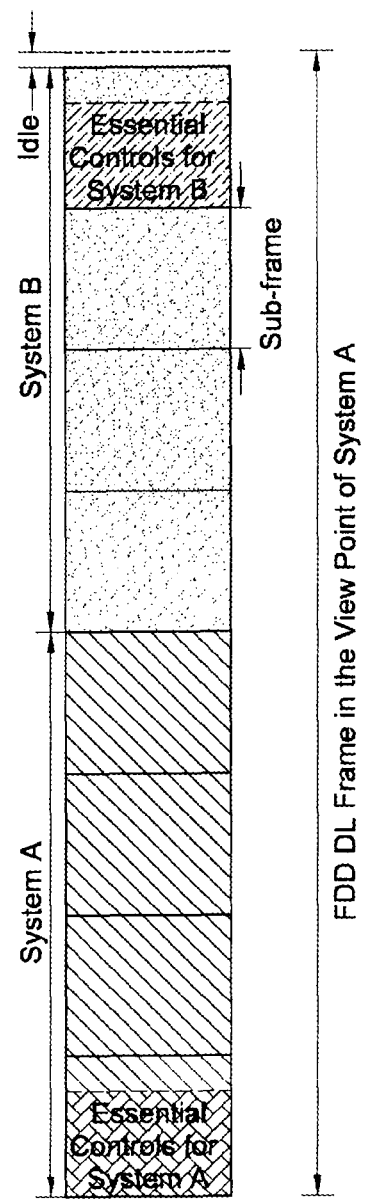
FIG. 25 shows another example of control information in a frame supporting heterogeneous systems.
Figure 26:
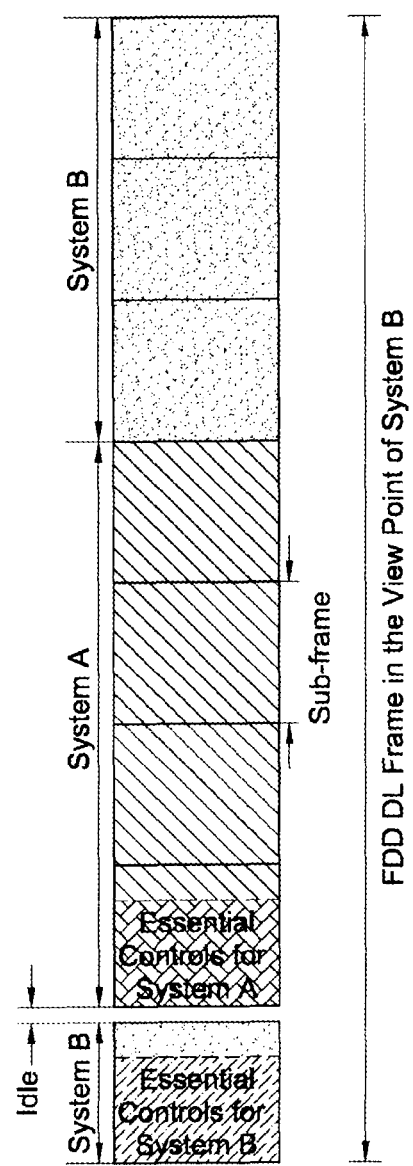
FIG. 26 shows another example of control information in a frame supporting heterogeneous systems.

FIG. 25 shows another example of control information in a frame supporting heterogeneous systems. FIG. 26 shows another example of control information in a frame supporting heterogeneous systems. The frame of FIG. 25 is a DL frame of an FDD frame defined in the viewpoint of a system A. The frame of FIG. 26 is a DL frame of an FDD frame defined in the viewpoint of a system B.

Referring to FIG. 25 and FIG. 26, in an FDD frame defined in the viewpoint of the system A, essential control information of the system A can be defined as a start of a frame, and an idle time can be defined as an end of the frame. The essential control information of the system A is allocated to a first DL sub-frame, and essential control information of the system B is allocated to a last DL sub-frame.

In an FDD frame defined in the viewpoint of the system B, the essential control information of the system B can be defined as a start of a frame. Subsequent to a DL sub-frame to which the essential control information of the system B is allocated, a DL sub-frame for the system A follows with an idle time being located between them. The essential control information of the system A is allocated to a first DL sub-frame among DL sub-frames for the system A. Subsequent to the DL sub-frame for the system A, a DL sub-frame for the system B follows except for a DL sub-frame to which the essential control information of the system B is allocated. An end of the frame can be defined as an end of a last DL sub-frame among the DL subframes for the system B. It is the same as when sub-frames in a frame are cyclic shifted so that a DL sub-frame to which the essential control information of the system B is allocated comes first in the frame in the FDD frame defined in the viewpoint of the system A.

Irrespective of whether the FDD frame is defined in the viewpoint of the system A or the FDD frame is defined in the viewpoint of the system B, when cyclic shift is performed so that the essential control information of the system A is allocated to a first DL sub-frame and the essential control information of the system B is allocated to a last DL sub-frame in contiguous DL frames, the number of SSPs can be maintained to one.

A size of the frame for supporting the heterogeneous systems can be defined such that a plurality of sub-frames are included and at least one piece of essential control information is included. That is, the frame can be defined as a period of the essential control information. The essential control information of the system A and the system B may be allocated together in one frame while having either the same period or different periods. Hereinafter, a case where the essential control information of the system A and the essential control information of the system B have different periods will be described.

Figure 27:
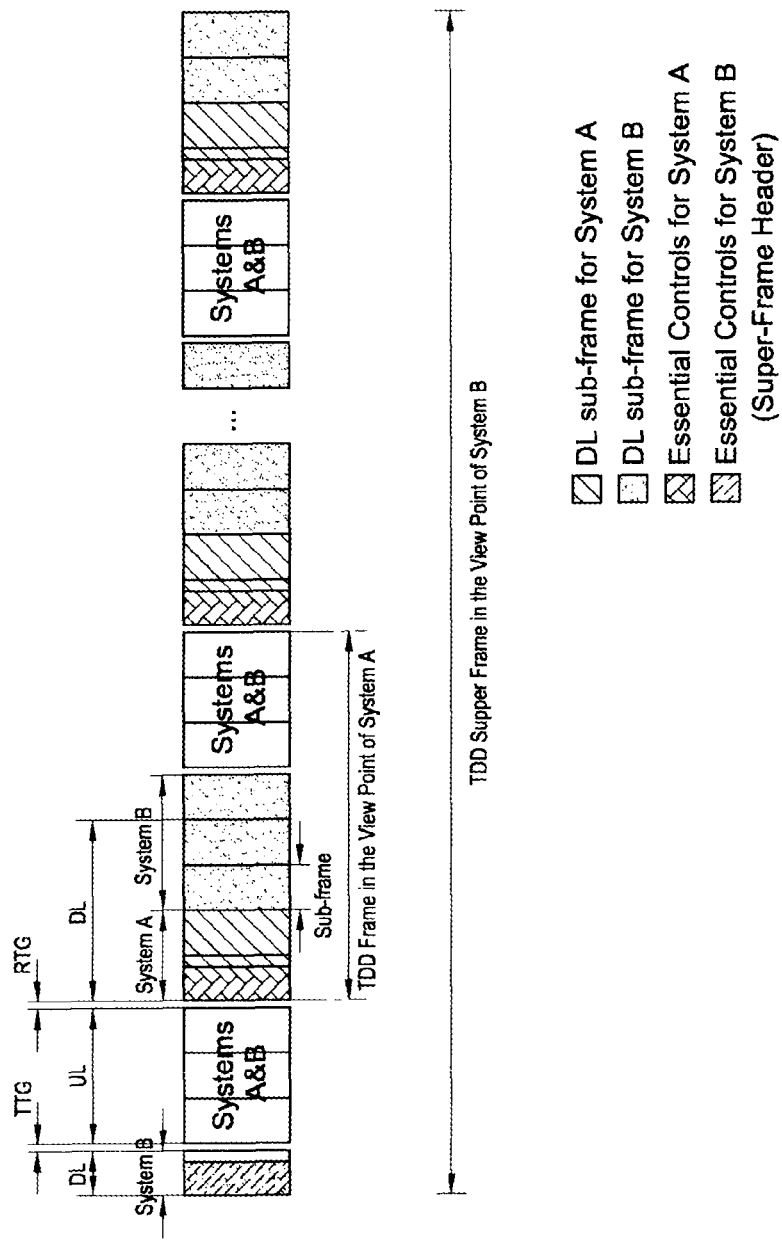
FIG. 27 shows an example of a super-frame supporting heterogeneous systems.

FIG. 27 shows an example of a super-frame supporting heterogeneous systems. The super-frame of FIG. 27 is a super-frame in the viewpoint of a system B when a system A and the system B uses a TDD scheme.

Referring to FIG. 27, essential control information of the system B and essential control information of the system A have a size that is a multiple integer of a period. That is, a size of a frame for the system B is a multiple integer of a size of a frame for the system A. A period of the essential control information of the system A can be regarded as a size of frame, and a period of the essential control information of the system B can be regarded as a size of super-frame.

The essential control information of the system B is allocated to a first sub-frame of the super-frame. The essential control information of the system B can be regarded as a header of the super-frame. System information, synchronization information, or the like which is to be broadcast is allocated to the super-frame header. The super-frame includes a plurality of frames. The essential control information of the system A is allocated to each frame. In the frame in the viewpoint of the system A, the essential control information of the system A is allocated to a first sub-frame of the frame, and can be regarded as a header of the frame. The frame header includes information on resource configuration of the frame. There is no limitation on the number of frames included in the super-frame.

Figure 28:
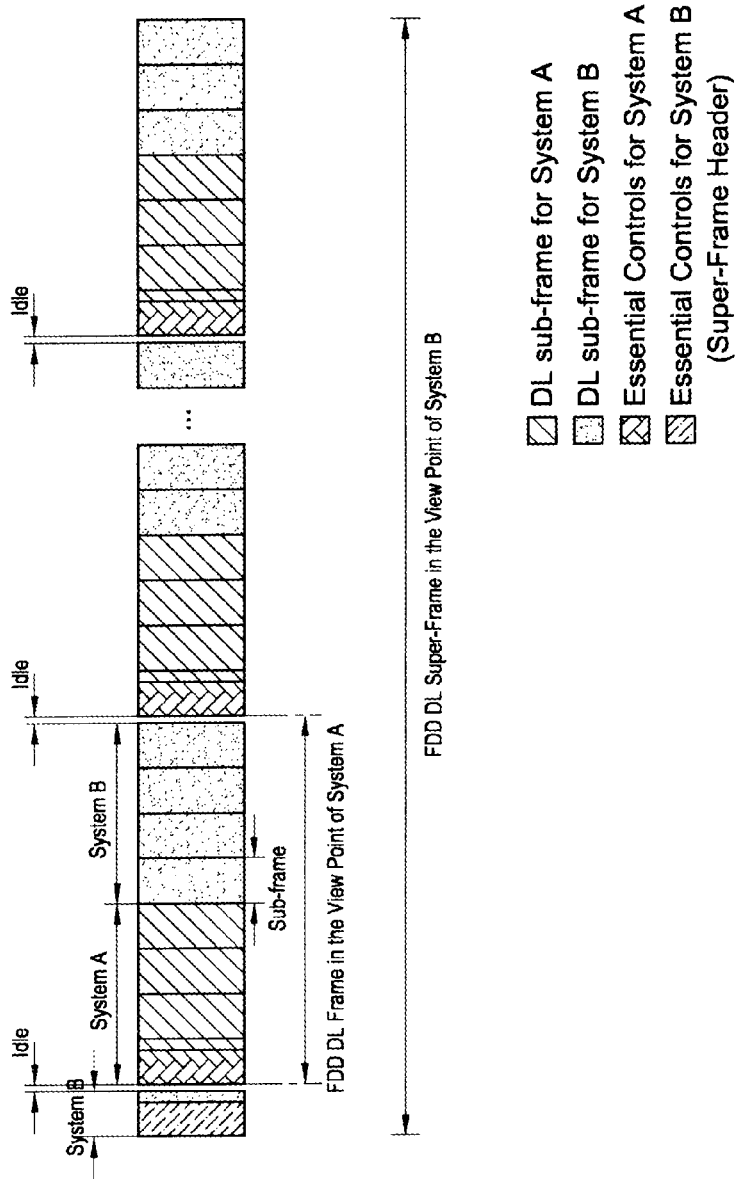
FIG. 28 shows another example of a super-frame supporting heterogeneous systems.

FIG. 28 shows another example of a super-frame supporting heterogeneous systems. The super-frame of FIG. 28 is a DL super-frame in the viewpoint of a system B when a system A and the system B use an FDD scheme.

Referring to FIG. 28, essential control information of the system B and essential control information of the system A have a size that is a multiple integer of a period. A period of the essential control information of the system A can be regarded as a size of frame, and a period of the essential control information of the system B can be regarded as a size of super-frame. The essential control information of the system B is allocated to a first sub-frame of the super-frame, and can be regarded as a header of the super-frame. System information, synchronization information, or the like which is to be broadcast is allocated to the super-frame header. The super-frame includes a plurality of frames. The essential control information of the system A is allocated to each frame. In the frame in the viewpoint of the system A, the essential control information of the system A is allocated to a first sub-frame of the frame, and can be regarded as a header of the frame. The frame header includes information on resource configuration of the frame. There is no limitation on the number of frames included in the super-frame.

In the proposed frame described above, the essential control information is not limited by definition to minimum control information that must be acquired by a UE using a corresponding system. The essential control information of the system A and the essential control information of the system B may consist of the same type of control information or may consist of different types of control information. Further, the super-frame, the frame, and the sub-frame are not limited in their sizes. The system A and the system B may use different-sized frames. However, a size of the sub-frame which is a minimum unit of multiplexing the system A and the system B may be identical between the systems. In addition, since the proposed control information allocation method is achieved using DL transmission, a method of multiplexing heterogeneous systems is not particularly limited in UL transmission. As a radio resource for the essential control information, the entirety or a part of the sub-frame may be allocated. When the radio resource for the essential control information is allocated as a part of the sub-frame, a position, size, or the like of the essential control information is not limited in the sub-frame.

According to the present invention, in a frame supporting heterogeneous systems, essential control information can be fixedly allocated to a specific position while maintaining the number of system switching points, at which switching occurs between the systems, to one even if a radio resource allocation amount changes between the systems, and thus the essential control information that must be received by all user equipments can be effectively provided without the increase of overhead. In addition, cell measurement can be performed for handover on the basis of the essential control information allocated to the fixed position without having to detect whether the heterogeneous systems are multiplexed, and thus overhead caused by control signaling can be decreased.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for transmitting information by a base station in a broadcast system, the method comprising:
    allocating, through a processor in the base station, first information of a first service to a first subframe of a downlink frame, wherein the first information is allocated in a full range of frequency domain resources and a partial range of time domain resources of the downlink frame;
    allocating, through the processor in the base station, second information of a second service to a second subframe of the downlink frame, wherein the second information is allocated in a partial range of frequency domain resources and a partial range of time domain resources of the downlink frame; and
    transmitting, through the processor in the base station, the downlink frame including the first subframe and the second subframe,
    wherein the downlink frame further includes first signaling information, second signaling information and third signaling information at a beginning of the downlink frame, and
    wherein the first signaling information includes information for synchronization, frequency offset estimation and channel estimation, and the second signaling information includes size information and coding scheme information of the third signaling information,
    wherein the first signaling information precedes the second signaling information in the downlink frame.

2. The method of claim 1, wherein data symbols in the downlink frame are orthogonal frequency division multiplexing (OFDM) symbols.

* * * * *